(12) United States Patent
Jin et al.

(10) Patent No.: US 12,356,271 B2
(45) Date of Patent: Jul. 8, 2025

(54) DEVICE AND TERMINAL OPERATION IN NEXT GENERATION MOBILE COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 17/794,445

(22) PCT Filed: Feb. 2, 2021

(86) PCT No.: PCT/KR2021/001338
§ 371 (c)(1),
(2) Date: Jul. 21, 2022

(87) PCT Pub. No.: WO2021/157991
PCT Pub. Date: Aug. 12, 2021

(65) Prior Publication Data
US 2023/0081518 A1   Mar. 16, 2023

(30) Foreign Application Priority Data
Feb. 5, 2020  (KR) .................... 10-2020-0013944

(51) Int. Cl.
*H04W 36/00* (2009.01)
*H04W 36/30* (2009.01)

(52) U.S. Cl.
CPC ...... *H04W 36/305* (2018.08); *H04W 36/0011* (2013.01); *H04W 36/0058* (2018.08); *H04W 36/00698* (2023.05)

(58) Field of Classification Search
CPC ......... H04W 36/0011; H04W 36/0058; H04W 36/00698; H04W 36/305; H04W 76/19; H04W 76/15; H04W 8/24
(Continued)

(56) References Cited

U.S. PATENT DOCUMENTS

| 2019/0045568 A1 | 2/2019 | Palat et al. |
| 2019/0182881 A1 | 6/2019 | Teyeb et al. |

(Continued)

FOREIGN PATENT DOCUMENTS

| CN | 110431873 A | 11/2019 |
| EP | 3 624 547 A1 | 3/2020 |

(Continued)

OTHER PUBLICATIONS

European Search Report dated Nov. 7, 2022, issued in European Application No. 21750213.7.

(Continued)

*Primary Examiner* — Candal Elpenord
(74) *Attorney, Agent, or Firm* — Jefferson IP Law, LLP

(57) ABSTRACT

Disclosed are a communication technique which merges, with IoT technology, a 5G communication system for supporting a data transmission rate higher than that of after a 4G system, and a system therefor. The present disclosure can be applied to intelligent services (for example, smart homes, smart buildings, smart cities, smart cars or connected cars, healthcare, digital education, retail, security- and safety-related services, and the like) on the basis of 5G communication technology and IoT-related technology. The present disclosure relates to an operation method of a terminal in a wireless communication system and, particularly, to a method and a device for performing same, the method comprising the steps of: generating master cell group (MCG) failure information, transmitting the MCG failure (Continued)

information to a base station of a secondary cell group (SCG), receiving a radio resource control (RRC) reconfiguration message from the base station, and transmitting an RRC reconfiguration completion message on the basis of the RRC reconfiguration message, wherein, if the RRC reconfiguration message is included in a downlink information transfer message so as to be received via signaling radio bearer (SRB) 3 of the SCG, the RRC reconfiguration completion message is transmitted via configured SRB1 on the basis of the RRC reconfiguration message.

20 Claims, 15 Drawing Sheets

(58) Field of Classification Search
USPC .......................................... 370/311, 331–332
See application file for complete search history.

(56) References Cited

U.S. PATENT DOCUMENTS

| | | | |
|---|---|---|---|
| 2019/0289510 A1* | 9/2019 | Rugeland | H04W 36/0079 |
| 2019/0356536 A1 | 11/2019 | Lee et al. | |
| 2020/0059395 A1* | 2/2020 | Chen | H04W 28/082 |
| 2020/0107390 A1 | 4/2020 | Hwang et al. | |
| 2020/0113012 A1 | 4/2020 | Lee et al. | |
| 2021/0314826 A1* | 10/2021 | Chang | H04W 36/305 |
| 2021/0385897 A1* | 12/2021 | Purkayastha | H04W 36/087 |
| 2022/0086710 A1* | 3/2022 | Xu | H04W 36/305 |

FOREIGN PATENT DOCUMENTS

| | | |
|---|---|---|
| KR | 10-2018-0136862 A | 12/2018 |
| KR | 10-2020-0114943 A | 10/2020 |
| WO | 2017/196095 A2 | 11/2017 |
| WO | 2018/171577 A1 | 9/2018 |
| WO | 2021/091629 A1 | 5/2021 |

OTHER PUBLICATIONS

Qualcomm Incorporated, 'Remaining issues of Fast MCG Recovery', R2-1912198, 3GPP TSG RAN WG2 Meeting #107bis, Chongqing, China, Oct. 4, 2019.

ZTE Corporation et al., 'Discussion on solutions for MCG fast recovery', R2-1907104, 3GPP TSG RAN WG2 Meeting #106, Reno, USA, May 3, 2019.

Huawei, 'Fast MCG link Recovery with SRB3 and split SRB1', R3-197227, 3GPP TSG RAN3 Meeting #106, Reno, USA, Nov. 9, 2019.

Interdigital Inc., 'Further Aspects of Fast MCG Link Recovery', R2-1906391, 3GPP TSG RAN WG2 Meeting #106, Reno, USA, May 3, 2019.

3GPP TS 38.321 V16.8.0 (Mar. 2022) 3rd Generation Partnership Project; Technical Specification Group Radio Access Network; NR; Medium Access Control (MAC) protocol specification (Release 16), Apr. 14, 2022.

Anonymous, "3rd Generation Partnership Project; Technical Specification Group Radio Access Network; NR; Radio Resource Control (RRC) protocol specification (Release 15)", 3GPP Standard, Technical Specification, 3GPP TS 38.331 V15.7.0, Sep. 2019.

European Office Action dated Sep. 18, 2024, issued in European Patent Application No. 21750213.7.

Huawei et al., Ensuring timely completion of MCG recovery in all cases, R2-1907502, 3GPP TSG-RAN WG2 Meeting#106, May 3, 2019, Reno, USA.

Chinese Office Action dated Apr. 19, 2025, Chinese Application No. 202180012343.8.

\* cited by examiner

DEVICE AND TERMINAL OPERATION IN NEXT GENERATION MOBILE COMMUNICATION SYSTEM

TECHNICAL FIELD

The disclosure relates to the operation of a user equipment (UE) and a base station in a mobile communication system. In addition, the disclosure relates to a device and a UE operation of receiving an RRC message in the next generation mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

DISCLOSURE OF INVENTION

Technical Problem

The disclosure is to provide the operation of a user equipment (UE) and the operation of a base station that communicates with the UE in the next generation mobile communication system.

In addition, the disclosure is to provide a UE operation and device in the case of receiving an RRC reconfiguration message in response to MCG failure in the next generation mobile communication system.

In addition, the disclosure relates to a method of applying, even to the case in which a master cell group failure occurs, a secondary cell group recovery operation that is applied in case that a secondary cell group failure occurs, and is employed in a next generation mobile communication system, and particularly, embodies a UE operation in case that an RRC reconfiguration message is received in response to a master cell group failure.

Solution to Problem

To overcome the above-described drawback, the disclosure provides an operation method of a user equipment (UE) in a wireless communication system, the method including generating master cell group (MCG) failure information, transmitting the MCG failure information to a base station of a secondary cell group (SCG), receiving a radio resource control (RRC) reconfiguration message from the base station, and transmitting an RRC reconfiguration complete message based on the RRC reconfiguration message, wherein, in case that the RRC reconfiguration message is included in a downlink information transfer message and is received via a signaling radio bearer (SRB) 3 of the SCG, the RRC reconfiguration complete message is transmitted via an SRB1 configured based on the RRC reconfiguration message.

The disclosure provides a UE in a wireless communication system, the UE including a transceiver and a controller configured to perform control so as to generate master cell group (MCG) failure information, to transmit the MCG failure information to a base station of a secondary cell group (SCG), to receive a radio resource control (RRC) reconfiguration message from the base station, and to transmit an RRC reconfiguration complete message based on the RRC reconfiguration message, wherein, in case that the RRC reconfiguration message is included in a downlink information transfer message and is received via a signaling radio bearer (SRB) 3 of an SCG, the RRC reconfiguration complete message is transmitted via an SRB1 configured based on the RRC reconfiguration message.

The technical subjects pursued in the disclosure may not be limited to the above-mentioned technical subjects, and other technical subjects which are not mentioned may be clearly understood, through the following descriptions, by those skilled in the art to which the disclosure pertains.

Advantageous Effects of Invention

According to various embodiments of the disclosure, there may be provided the operation of a user equipment (UE) and the operation of a base station that communicates with a UE in the next generation mobile communication system.

In addition, according to various embodiments of the disclosure, there may be provided a UE operation and device in the case of receiving an RRC reconfiguration message in response to an MCG failure in the next generation mobile communication system.

In addition, according to various embodiments of the disclosure, in case that a UE receives an RRC reconfiguration message via a predetermined signaling radio bearer (SRB) in response to a master cell group failure, a master cell group recovery operation may be clearly defined by clearly determining an SRB to be used for transferring an RRC reconfiguration complete message and an operation related thereto.

MODE FOR THE INVENTION

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards or modified terms and names based thereon for the convenience of description. However, the disclosure is not limited by these terms and names, and may be applied in the same way to systems that conform other standards. That is, the disclosure may be applied to mobile communication system as a whole, in particular, all LTE and NR systems.

Figure 1:
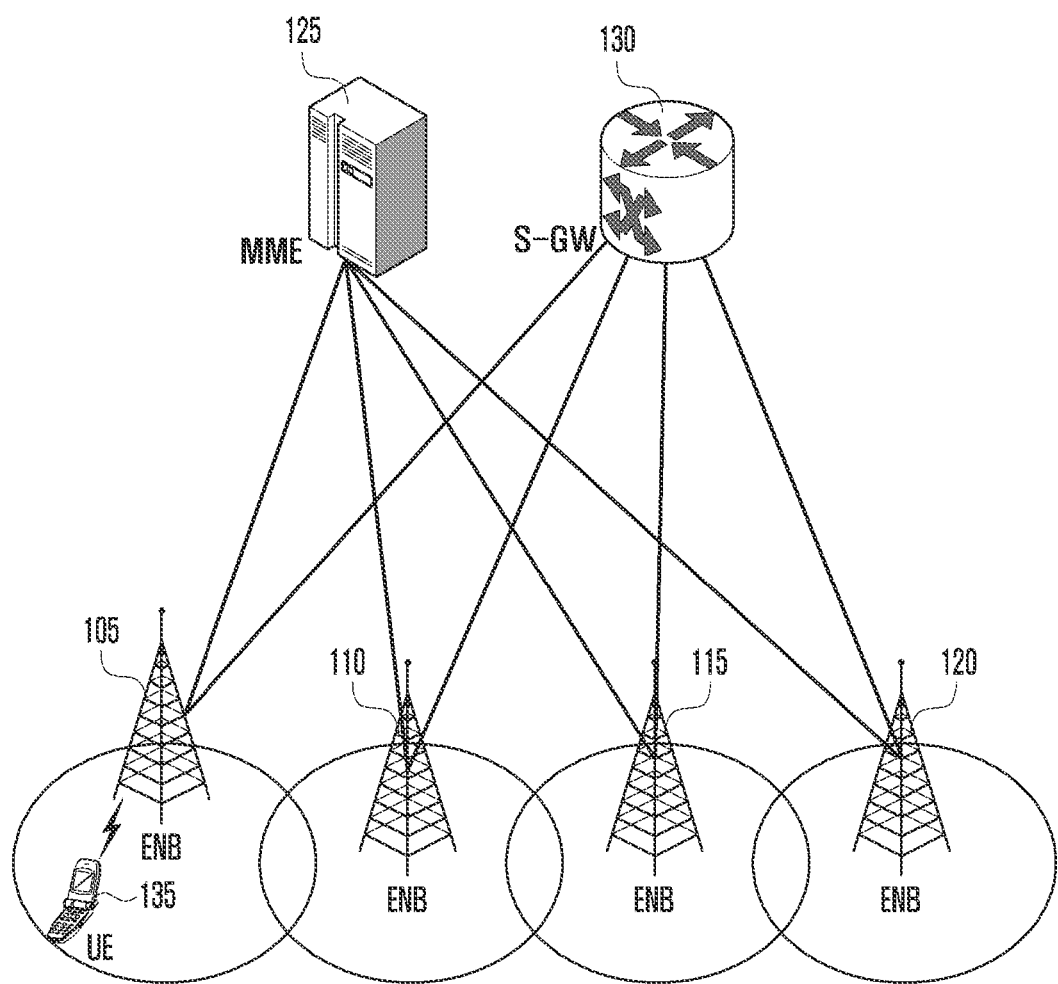
FIG. 1 is a diagram illustrating the structure of an LTE system, which is referred to for description of the disclosure.

FIG. 1 is a diagram illustrating the structure of an LTE system, which is referred to for description of the disclosure.

Referring to FIG. 1, as illustrated in the drawings, a radio access network of an LTE system includes a next generation base station (an Evolved Node B (eNB), a Node B, or a base station) 105, 110, 115, and 120, a mobility management entity (MME) 125, and a serving-gateway (S-GW) 130. A user equipment (UE) (or a terminal) 135 accesses an external network via the eNB 105 to 120 and the S-GW 130.

In FIG. 1, the eNB 105, 110, 115, and 120 correspond to an existing Node B in a UMTS system. The eNB 105 is connected to the UE 135 via a wireless channel and performs a more complex function in comparison with an existing Node B. In the LTE system, real-time services, such as a voice over IP (VoIP) through an Internet protocol, and all user traffic are provided via a shared channel. Accordingly, there is a desire for a device that performs scheduling by collecting state information, such as a buffer state, an available transmission power state, a channel state, and the like in association with UEs, and the eNB 105, 110, 115, and 120 may be in charge of the same. One eNB generally controls a plurality of cells. For example, in order to implement a transmission rate of 100 Mbps, the LTE system uses an orthogonal frequency division multiplexing (OFDM) as a wireless access technology in a bandwidth of 20 MHz. In addition, an adaptive modulation & coding (AMC) scheme that determines a modulation scheme and a channel coding rate may be applied based on the channel state of a UE. The S-GW 130 is a device for providing a data bearer, and generates or removes a data bearer according to control performed by the MME 125. The MME 125 is a device that is in charge of various control functions in addition to a mobility management function associated with a UE, and may be connected to a plurality of eNBs.

Figure 2:
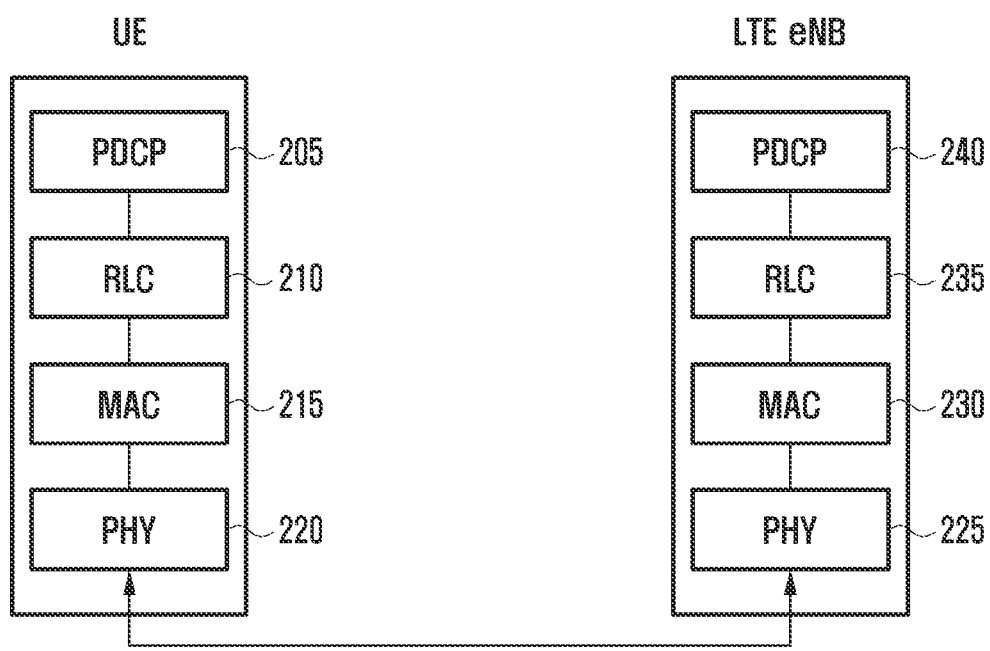
FIG. 2 is a diagram illustrating the structure of a radio protocol in an LTE system, which is referred to for description of the disclosure.

FIG. 2 is a diagram illustrating the structure of a radio protocol in an LTE system, which is referred to for description of the disclosure.

Referring to FIG. 2, the radio protocol of the LTE system may include packet data convergence protocol (PDCP) 205 and 240, radio link control (RLC) 210 and 235, medium access control (MAC) 215 and 230 for a UE and an eNB, respectively. The PDCP 205 and 240 is in charge of IP header compression/decompression and the like. The main functions of the PDCP 205 and 240 are summarized as follows.

Header compression and decompression (Header compression and decompression: ROHC only)
Transfer of user data
Sequential delivery (In-sequence delivery of upper layer PDUs at PDCP re-establishment procedure for RLC AM)
Reordering (For split bearers in DC (only support for RLC AM): PDCP PDU routing for transmission and PDCP PDU reordering for reception)
Duplicate detection (Duplicate detection of lower layer SDUs at PDCP re-establishment procedure for RLC AM)
Retransmission (Retransmission of PDCP SDUs at handover and, for split bearers in DC, of PDCP PDUs at PDCP data-recovery procedure, for RLC AM)
Ciphering and deciphering
Timer-based SDU discard (timer-based SDU discard in uplink)
The radio link control (RLC) 210 and 235 reestablishes a PDCP packet data unit (PDU) in an appropriate size, and performs ARQ or the like. The main functions of the RLC 210 and 235 are summarized as follows.
Transfer of data (Transfer of upper layer PDUs)
ARQ (Error correction through ARQ (only for AM data transfer))
Concatenation, segmentation and reassembly (concatenation, segmentation and reassembly of RLC SDUs (only for UM and AM data transfer))
Re-segmentation (Re-segmentation of RLC data PDUs (only for AM data transfer))
Reordering (Reordering of RLC data PDUs (only for UM and AM data transfer)
Duplicate detection (Duplicate detection (only for UM and AM data transfer))
Error detection (Protocol error detection (only for AM data transfer))
RLC SDU discard (RLC SDU discard (only for UM and AM data transfer))
RLC re-establishment
The MAC 215 and 230 is connected with various RLC layer devices configured for a single UE, and multiplexes RLC PDUs to a MAC PDU and de-multiplexes RLC PDUs from a MAC PDU. The main functions of the MAC 215 and 230 are summarized as follows.
Mapping (Mapping between logical channels and transport channels)
Multiplexing and demultiplexing (Multiplexing/demultiplexing of MAC SDUs belonging to one or different logical channels into/from transport blocks (TB) delivered to/from the physical layer on transport channels)
Scheduling information reporting
HARQ (Error correcting through HARQ)
Priority handling between logical channels (Priority handling between logical channels of one UE)
Priority handling between UEs (Priority handling between UEs by means of dynamic scheduling)
MBMS service identification
Transport format selection
Padding The PHY layers 220 and 225 perform an operation of channel-coding and modulating higher layer data to generate an OFDM symbol and transmitting the OFDM symbol via a wireless channel, or demodulating and channel-decoding an OFDM symbol received via a wireless channel and transmitting the demodulated and channel-decoded OFDM symbol to a higher layer.

Although not illustrated in the drawings, a radio resource control (RRC) layer exists above the PDCP layer of each of the UE and the eNB. In the RRC layer, configuration control messages related to access and measurement may be transmitted or received for radio resource control.

Figure 3:
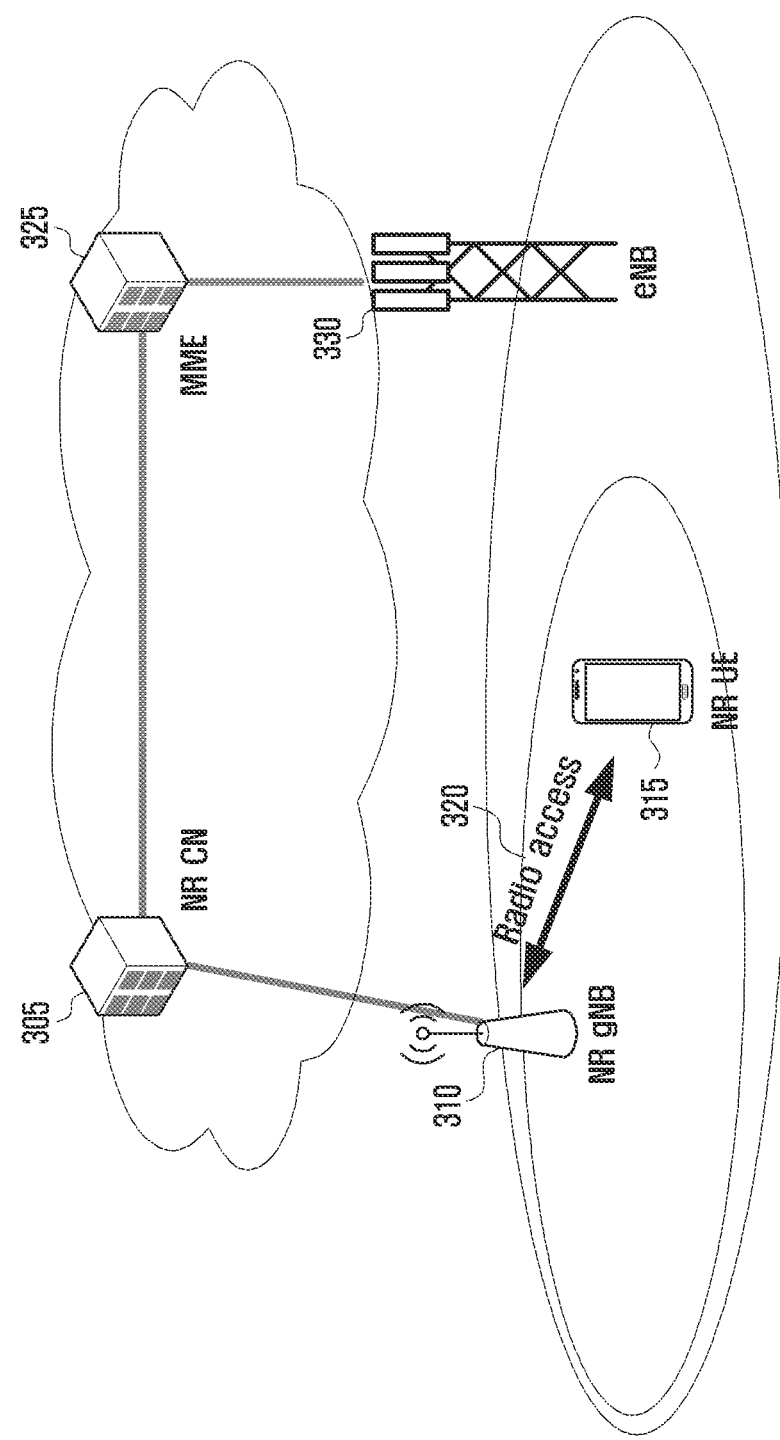
FIG. 3 is a diagram illustrating the structure of a next generation mobile communication system to which the disclosure is applied.

FIG. 3 is a diagram illustrating the structure of the next generation mobile communication system to which the disclosure is applied.

Referring to FIG. 3, a radio access network of the next generation mobile communication system includes a next generation base station (a new radio node B (NR NB) or an NR gNB) 310 and a new radio core network (NR CN) 305 as illustrated in the drawing. A user equipment (a new radio user equipment (NR UE) or a UE) 315 accesses an external network via the NR gNB 310 and the NR CN 305.

In FIG. 1C, the NR gNB 310 corresponds to an evolved Node B (eNB) of the legacy LTE system. The NR gNB is connected to the NR UE 315 via a wireless channel, and may provide a better service than a service from a legacy Node B. In the next generation mobile communication system, all user traffic are serviced via a shared channel. Accordingly, there is a desire for a device that performs scheduling by collecting state information such as a buffer state, an available transmission power state, a channel condition, and the like in association with UEs, and the NR gNB 310 in charge of the same. A single NR gNB generally controls a plurality of cells. In order to implement ultra-high speed data transmission when compared to the legacy LTE, a bandwidth greater than or equal to the current maximum bandwidth may be used, and orthogonal frequency division multiplexing (OFDM) is used as radio access technology and beamforming technology is additionally used. In addition, an adaptive modulation & coding (AMC) scheme that determines a modulation scheme and a channel coding rate may be applied based on the channel state of a UE. The NR CN 305 performs a function of supporting mobility, configuring a bearer, configuring a QoS, and the like. The NR CN 305 is a device that is in charge of various control functions in addition to a mobility management function associated with a UE, and may be connected to a plurality of base stations. In addition, the next generation mobile communication system may interoperate with the legacy LTE system, and the NR CN 305 may be connected to an MME 325 via a network interface. The MME 325 is connected to an eNB 330 which is a legacy eNB.

Figure 4:
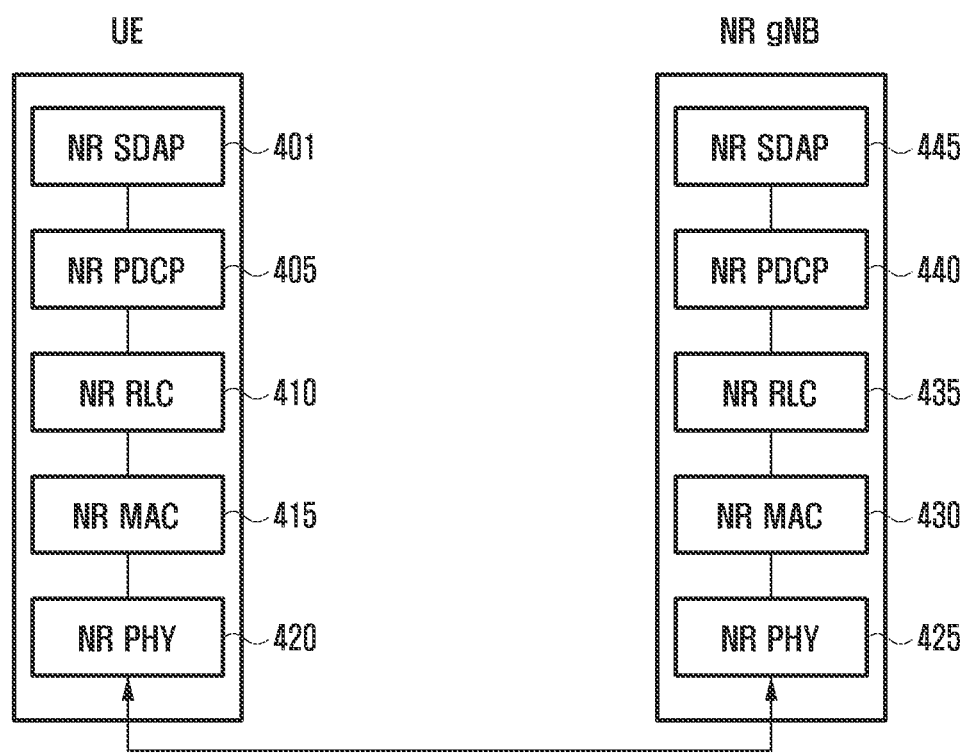
FIG. 4 is a diagram illustrating the structure of a radio protocol of the next generation mobile communication system to which the disclosure is applicable.

FIG. 4 is a diagram illustrating the structure of a radio protocol of the next generation mobile communication system to which the disclosure is applicable.

Referring to FIG. 4, the radio protocol of the network generation mobile communication system may include NR SDAP 401 and 445, NR PDCP 405 and 440, NR RLC 410 and 435, and NR MAC 415 and 430, respectively, for a UE and an NR gNB.

The main functions of the NR SDAP 401 and 445 may include some of the following functions.

Transfer of user data (transfer or user plane data)
    Mapping between a QoS flow and a data bearer for both an uplink and a downlink (mapping between a QoS flow and a DRB for both DL and UL)
    Marking a QoS flow ID in an uplink and a downlink (marking QoS flow ID in both DL and UL packets)
    Mapping a reflective QoS flow to a data bearer for uplink SDAP PDUs (reflective QoS flow to DRB mapping for the UL SDAP PDUs)

In association with an SDAP layer device, whether to use the header of the SDAP layer device or whether to use the function of the SDAP layer device may be configured for the UE via an RRC message for each PDCP layer device, for each bearer, or for each logical channel. If the SDAP header is configured, a NAS reflective QoS configuration one-bit indicator and an AS reflective QoS configuration one-bit indicator of the SDAP header may provide indication so that the UE updates or reconfigures mapping information between a QoS flow and a data bearer in an uplink and a downlink. The SDAP header may include QoS flow ID information indicating QoS. The QoS information may be used as data processing priority information, scheduling information, or the like for supporting a smooth service.

The main functions of the NR PDCP 405 and 440 may include some of the following functions.

Header compression and decompression: (Header compression and decompression: ROHC only)
    Transfer of user data
    Sequential delivery (In-sequence delivery of upper layer PDUs)
    Non-sequential delivery (Out-of-sequence delivery of upper layer PDUs)
    Reordering (PDCP PDU reordering for reception)
    Duplicate detection (duplicate detection of lower layer SDUs)
    Retransmission (Retransmission of PDCP SDUs)
    Ciphering and deciphering
    Timer-based SDU discard (Timer-based SDU discard in uplink)
    The reordering function of an NR PDCP device may refer to a function of sequentially reordering PDCP PDUs, received from a lower layer, according to a PDCP sequence number (SN), and may include a function of transferring sequentially reordered data to a higher layer, a function of immediately transferring data irrespective of a sequence, a function of recording lost PDCP PDUs after sequential reordering, a function of reporting the states of lost PDCP PDUs to a transmission side, and a function of requesting retransmission of lost PDCP PDUs.

The main functions of the NR RLC 410 and 435 may include some of the following functions.

Transfer of data (Transfer of upper layer PDUs)
    Sequential delivery (In-sequence delivery of upper layer PDUs)
    Non-sequential delivery (Out-of-sequence delivery of upper layer PDUs)
    ARQ (Error correcting through ARQ)
    Concatenation, segmentation, and reassembly (concatenation, segmentation and reassembly of RLC SDUs)
    Re-segmentation (Re-segmentation of RLC data PDUs)
    Reordering (Reordering of RLC data PDUs)
    Duplicate detection
    Error detection (Protocol error detection)
    RLC SDU discard
    RLC re-establishment The mentioned sequential delivery function (in-sequence delivery) of an NR RLC device refers to a function of sequentially transferring RLC SDUs, received from a lower layer, to a higher layer. If a single original RLC SDU is divided into multiple RLC SDUs and the multiple RLC SDUs are received, the in-sequence delivery function may include a function of reassembling and transferring the same. The in-sequence delivery function may include a function of reordering received RLC PDUs according to an RLC sequence number (SN) or a PDCP SN, a function of recording lost RLC PDUs after sequential reordering, a function of reporting the states of lost RLC PDUs to a transmission side, a function of requesting retransmission of lost RLC PDUs, a function of sequentially transferring only RLC SDUs before a lost RLC SDU, to a higher layer, if a lost RLC SDU exists, a function of sequentially transferring all RLC SDUs, received before a predetermined timer starts, to a higher layer even though a lost RLC SDU exists, if the predetermined timer expires, or a function of sequentially transferring all RLC SDUs, received up to the present, to a higher layer even though a lost RLC SDU exists, if a predetermined timer expires. In addition, RLC PDUs are processed in order of reception (in order of arrival, irrespective of a serial number or a sequence number), and are transmitted to a PDCP device irrespective of a sequence (Out-of-sequence delivery). In the case of segments, segments that are stored in a buffer or that are to be received in the future are received and reconfigured as a single intact RLC PDU, and the reconfigured one is processed and transmitted to a PDCP device. The NR RLC layer may not include a concatenation function. In addition, the concatenation function may be performed in the NR MAC layer or may be replaced with a multiplexing function in the NR MAC layer.

The non-sequential delivery function (out-of-sequence delivery) of an NR RLC device is a function of immediately transferring RLC SDUs, received from a lower layer, to a higher layer irrespective of a sequence. If a single original RLC SDU is divided into multiple RLC SDUs and the multiple RLC SDUs are received, the non-sequential delivery function may include a function of reassembling and transmitting the same, and a function of storing the RLC SN or PDCP SN of the received RLC PDUs, and performing sequential ordering, and recording lost RLC PDUs.

The NR MAC 415 and 430 may be connected to multiple NR RLC layer devices configured for a single UE, and the main functions of the NR MAC may include some of the following functions.

Mapping (Mapping between logical channels and transport channels)
    Multiplexing and demultiplexing (multiplexing/demultiplexing of MAC SDUs)
    Scheduling information reporting
    HARQ (Error correcting through HARQ)
    Priority handling between logical channels (priority handling between logical channels of one UE)
    Priority handling between UEs (priority handling between UEs by means of dynamic scheduling)
    MBMS service identification
    Transport format selection
    Padding The NR PHY layer 420 and 425 performs channel-coding and modulating of higher layer data to generate an OFDM symbol and transmits the OFDM symbol via a wireless channel, or performs demodulating and channel-decoding of an OFDM symbol, received via a wireless channel, and transmits the demodulated and channel-decoded OFDM symbol to a higher layer.

Although not illustrated in the drawings, a radio resource control (RRC) layer is present above the PDCP layer of each of the UE and the gNB. In the RRC layer, configuration control messages related to access and measurement may be transmitted or received for radio resource control.

Figure 5:
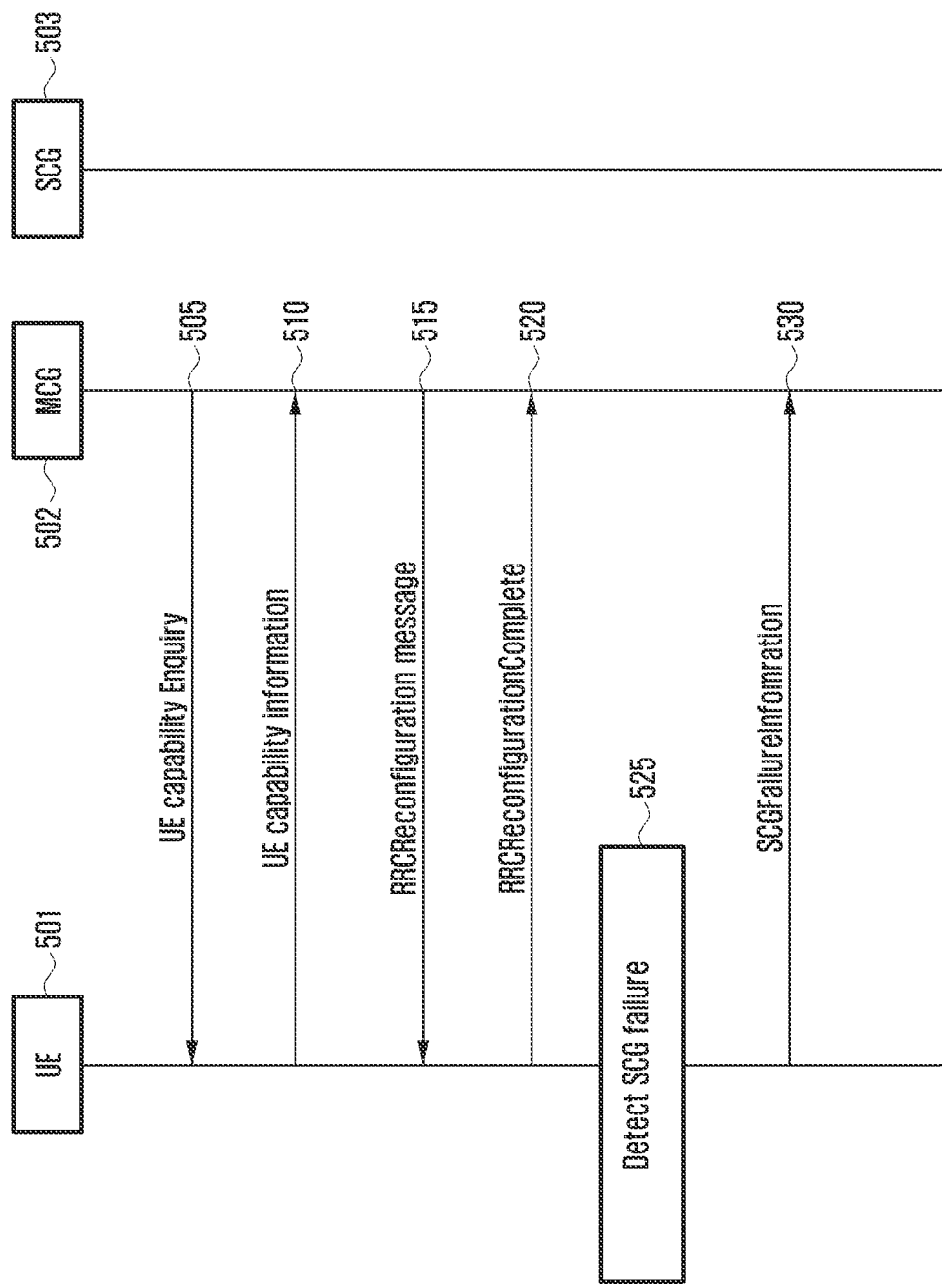
FIG. 5 is a diagram illustrating the entire operation of transferring an SCGFailureInformation message in case that an SCG failure occurs, which is referred to in the disclosure.

FIG. 5 is a diagram illustrating the entire operation of transferring an SCGFailureInformation message in case that an SCG failure occurs, which is referred to in the disclosure. In the embodiment of FIG. 5, an MCG may be used interchangeably with a base station of the MCG and a serving base station of the MCG, and an SCG may be used interchangeably with a base station of the SCG and a serving base station of the SCG.

A UE 501 in the state of being connected to an MCG that is a serving base station 502 of the MCG may receive a request for reporting of UE capability via a UECapabilityEnquiry message from the base station 502 in operation 505, and may transfer a UECapabilityInformation message including the UE capability information of UE itself to the base station 502 in response thereto in operation 510. The corresponding UE capability information message may include UE capability associated with whether SCG failure reporting and recovery is supported. This may be transferred in one bit for each UE, or may indicate capability associated with a predetermined radio access technology (RAT) type. The base station 502 that identifies the UE information may determine that the corresponding UE 501 is capable of transferring an SCG failure message to the base station 502 in case that an SCG failure occurs, and later on, in the case of instructing SCG recovery and release based on the corresponding information, the base station 502 may be aware that the corresponding operation is capable of being applied.

In operation 515, the base station 502 may transfer, to the UE 501, an RRC reconfiguration message including overall configuration information for data transmission or reception and control in an RRC connected state. The message may include a radio bearer configuration, SCell addition and change, a dual connectivity configuration, a measurement configuration, and the like. In operation 520, the UE 501 may transfer, to base station 502, an RRC reconfiguration complete message to the base station 502 in order to confirm that reception of the RRC reconfiguration message is completed and the corresponding configuration is applied. In the drawing, it is assumed that the base station 502 configures dual connectivity (hereinafter referred to as DC) for the UE 501 in the corresponding operation. Subsequently, the UE 501 performs data transmission or reception with the base station 502 by applying the configured information, and may identify a problem in a connection state associated with a secondary cell group (SCG) in a predetermined situation and may declare an SCG failure in operation 525. The predetermined situation may be the expiration of a T310 timer, a random access failure, the case in which the number of RLC retransmissions exceeds the maximum number of RLC retransmissions, an SCG synchronization failure, an SCG reconfiguration failure, an integrity failure associated with an SRB3, and the like. For reference, operations associated with T310 are as shown in Table 1 below.

TABLE 1

| | Start point | End point | Expiration |
|---|---|---|---|
| T310 | Upon detecting physical layer problems for the SpCell i.e. upon receiving N310 consecutive outof-sync indications from lower layers | Upon receiving N311 consecutive in-sync indications from lower layers forthe SpCell, upon receiving RRCReconfigurationwith reconfigurationWithSync for that cell group, and upon initiating the connection re-establishment procedure. Upon SCG release, it foe T310 is kept in SCG. | If the T310 is kept in MCG: If AS security is not activated: go to RRC_IDLE else. initiate the connection re-establishment procedure. If the T310 is kept in SCG Inform E-UTRAN/NR about the SCG radio link failure by initiating the SCG failure information procedure as specified in 5.7.3. |

For the reason above, in the case in which the UE 501 identifies a problem in the connection state of the SCG, the UE 501 may generate an SCGFailureInformation message, and may transfer the same to the base station 502 in operation 530. The SCGFailureInformation message may include a cause of the failure, measurement frequency information measured by the UE, measurement frequency information configured for the UE 501 via the SCG, and a measurement value of the corresponding frequency. For reference, the configuration of SCGFailureInformation is as shown in Table 2 below.

TABLE 2

| | |
|---|---|
| SCGFailureInformation ::=<br>  criticalExtensions<br>    scgFailureInformation<br>    CriticalExtensionsFuture<br>  }<br>}<br>SCGFailureInformation-IEs ::=<br>  failureReportSCG<br>  nonCriticalExtension<br>}<br>FailureReportSCG ::=<br>  failureType | SEQUENCE {<br>  CHOICE {<br>    SCGFailureInfomation-IEs,<br>    SEQUENCE { }<br><br><br>SEQUENCE {<br>  FailureReportSCG    OPTIONAL,<br>  SEQUENCE { }    OPTIONAL<br><br>SEQUENCE {<br>  ENUMERATED { |

TABLE 2-continued

```
                              t310-Expiry, randomAccessProblem,
                              rlc-MaxNumRetx,
                              synchReconfigFailureSCG, scg-ReconfigFailure,
                              srb3-IntegrityFailure, spare2, spare1},
    measResultFreqList        MeasResultFreqList              OPTIONAL,
    measResultSCG-Failure     OCTET STRING (CONTAINING MeasResultSCG-Failure)
OPTIONAL,
    ...
}
MeasResultFreqList ::=        SEQUENCE (SIZE (1..maxFreq)) OF MeasResult2NR
```

Figure 6:
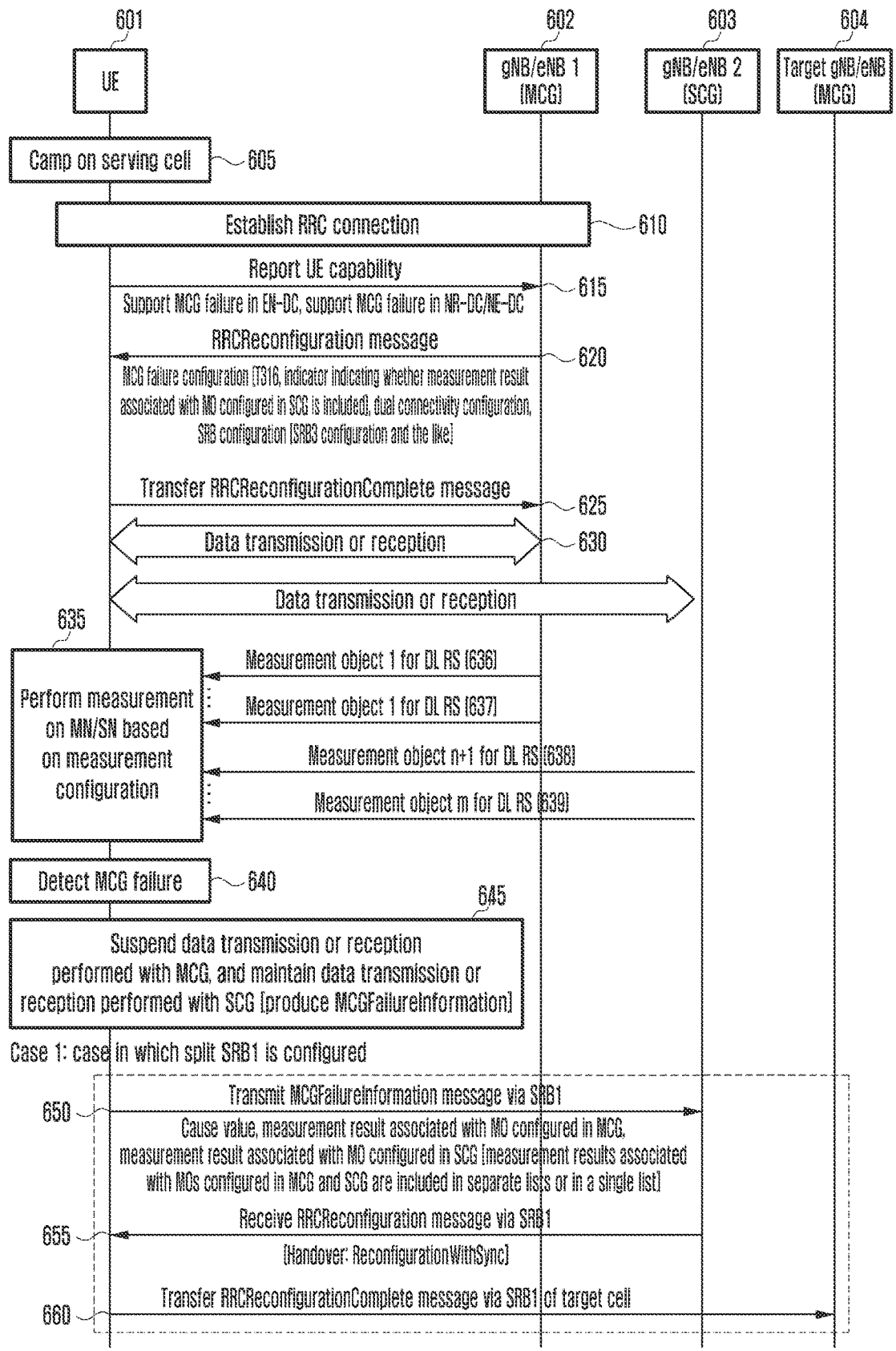
FIG. 6 is a diagram illustrating, as embodiment 1 of the disclosure, the entire procedure in which a user equipment (UE) reports an MCG failure and receives and applies a response message thereto in case that a split SRB of an SRB1 is configured.

FIG. 6 is a diagram illustrating, as embodiment 1 of the disclosure, the entire procedure in which a UE reports an MCG failure and receives and applies a response message thereto in case that a split SRB of an SRB1 is configured. In the embodiment of FIG. 6, an MCG may be used interchangeably with a base station of the MCG and a serving base station of the MCG, and an SCG may be used interchangeably with a base station of the SCG and a serving base station of the SCG.

In operation 605, the UE 601 may camp on a predetermined base station, may receive system information from a corresponding serving cell, and may prepare for a connected state. Subsequently, for a predetermined reason, the UE 601 may perform an RRC connection procedure with the corresponding serving cell (MCG) 602 in operation 610. In operation 615, the UE 601 may receive a request for reporting of UE capability via an UECapabilityEnquiry message from the base station 602, and may transfer, to the base station 602, an UECapabilityInformation message measurement configuration, and the like. Particularly, in the drawing, a DC configuration (an SCG configuration), a radio bearer configuration (a DRB configuration, an SRB configuration, particularly, an SRB3 configuration, and the like), and MCG failure-related configuration information for quick MCG recovery (T316, an indicator including a measurement result associated with an MO configured in the SCG) may be provided in the corresponding operation. The T316 timer is a guard timer up to performing of an RRC re-establish operation after declaration of an MCG failure, and is triggered in case that the UE 601 transmits MCGFailureInformation, and the UE 601 may perform RRC re-establish operation in case that the corresponding timer expires. This may be construed as the time in which the UE is awaiting a response from the base station 602 in response to MCGFailureInformation during a predetermined period of time. For reference, the description associated with the T316 timer is as shown in Table 3 below.

TABLE 3

| | Start point | End point | Expiration |
| --- | --- | --- | --- |
| 1316 | Upon transmission of the MCGFailureInformaton message | Upon resumption of MCG transmission, upon reception of RRCRelease, or upon initialing the re-establishment procedure, | Perform the actions as specified in 5.7.y.5. | including UE capability information of the UE itself in response thereto. The corresponding UE capability information message may include UE capability associated with whether MCG failure reporting and recovery is supported. This may be transferred in one bit for each UE, or may indicate capability associated with a predetermined RAT type. For example, one bit supporting MCG failure reporting and recovery in EN-DC and one bit supporting MCG failure reporting and recovery in NR-DC and NE-DC may be respectively indicated, or one bit supporting MCG failure reporting and recovery in EN-DC may include UE capability in NR-DC and NE-DC and may be indicated. The base station 602 that identifies the UE information may determine that the corresponding UE 601 is capable of transferring an MCG failure report message to the base station 602 in case that an MCG failure occurs (since an MCG failure occurs, the message may be transferred to the MCG base station via the SCG), and later on, in the case of instructing handover and connection release based on the corresponding information, the base station 602 may be aware that the corresponding operation is capable of being applied.

Based on the UE capability report in the operation, the base station 602 may transfer an RRC reconfiguration message to the UE 601 in operation 620, and the corresponding message may include a radio bear configuration, an SCell addition and change, a dual connectivity configuration, a In operation 625, the UE 601 may transfer, to the base station 602, an RRC reconfiguration complete message to the base station 502 in order to confirm that reception of the RRC reconfiguration message is completed and the corresponding configuration is applied. Subsequently, the UE 601 may perform data transmission or reception with the base station 602 by applying configured information in operation 630, and may perform channel measurement on a serving cell and neighboring cells according to a measurement configuration configured during the RRC reconfiguration in operation 635. In this instance, the measurement configuration may correspond to measurement objects (MO) 636 and 637 of a serving frequency and an adjacent frequency that are configured by a master node (MN), and measurement objects (MO) 638 and 639 of a serving frequency and an adjacent frequency that are configured by a secondary node (SN), and the UE 601 may perform measurement on a configured MO, may apply a measurement value, and may report the same in a predetermined situation.

In operation 640, the UE 601 that supports an MCG recovery and failure reporting in a predetermined situation may identify a problem in a connection state associated with the MCG and may declare an MCG failure. The predetermined situation may be the expiration of a T310 timer, a random access failure, the case in which the number of RLC retransmissions exceeds the maximum number of RLC retransmissions, and the like. For the operations associated with the T310, refer to Table 4 below.

TABLE 4

| | Start point | End point | Expiration |
|---|---|---|---|
| T310 | Upon detecting physical layer problems for the SpCell i.e. upon receiving N310 consecutive out-of-sync indications from lower layers. | Upon receiving N311 consecutive in-sync indications from lower layers for the SpCell, upon receiving RRCReconfiguration with reconfigurationWithSync for that cell group, and upon initiating the connection re-establishment procedure. Upon SCG release, if the T310 is kept in SCG. | If the T310 is kept in MCG: If AS security is not activated: go to RRC_IDLE else: initiate the MCG failure information procedure as specified in 5.7.y or the connection re-establishment procedure as specified in 5.3.7. If the T310 is kept in SCG, Inform E-UTRAN/NR about the SCG radio link failure by initiating the SCG failure information procedure as spacified in 5.7.3. |

The UE 601 that triggers the MCG failure may declare the MCG failure in this operation, and may generate MCGFailureInformation in operation 645, and the corresponding message may include at least one among a measurement value of an MCG frequency (e.g., NR), a cause of the MCG failure, a measurement value of an SCG frequency (e.g., LTE), a measurement value of a non-serving cell, and the like. In addition, the measurement values of the MCG and SCG frequencies may be reported separately depending on which of the MCG and the SCG performs configuration, or an MCG frequency measurement value and an SCG frequency measurement value may be reported irrespective of a cell group that performs configuration. That is, measurement results of MOs configured by the MCG and SCG may be included in separate lists or a single list. In addition, in this operation, the UE 601 may suspend data transmission or reception performed with the MCG and maintain data transmission or reception performed with the SCG. Table 5 shown below is an example of the structure of MCGFailureInformation, and Table 6 is the field description of information elements included in Table 5. The following is an example in which measurement results configured by the MCG and SCG are included in separate lists.

- A measurement list configured by an MCG: measResultFreqList-r16, measResultFreqListEUTRA-r16
- A measurement list configured by an SCG: measResultSCG-r16, measResultSCG-EUTRA-r16 (the corresponding fields may be included in the measurement list configured by an MCG, and may be transferred, and in that case, the corresponding fields are not needed.)

TABLE 6

MCGFailureInformation field descriptions measResultFreqList

The field contains available results of measurements on NR frequencies the UE is configured to measure by the measConfig associated with the MCG.

measResultFreqListEUTRA

The field contains available results of measurements on E-UTRA frequencies the UE is configured to measure by measConfg associated with the MCG.

measResultSCG

The field contains the MeasResultSCG-Failure IE which includes available measurement results on NR frequencies the UE is configured to measure by the measConfig associated with the SCG.

measResultSCG-EUTRA

The field contains the EUTRA MeasResultSCG-FailureMRDC IE which includes available results of measurements on E-UTRA frequencies the UE is configured to measure by the E-UTRA RRCConnectionReconfiguration message as specified in TS 36.331 [10].

In the present embodiment, the following relates to the case in which the base station 602 configures DC for the UE 601 and configures a split bearer for an SRB1, that is, a split SRB1, in operation 620, and the case may include the case in which a split SRB1 and an SRB3 are configured simultaneously. For reference, a split bearer is capable of being applied to both an SRB1 and an SRB2, but the embodiments of the disclosure assume only the application to an SRB1. In addition, for the PDCP of a split bearer, an entity that belongs to a single cell group is used, and data transmission

TABLE 5

Figure 7:
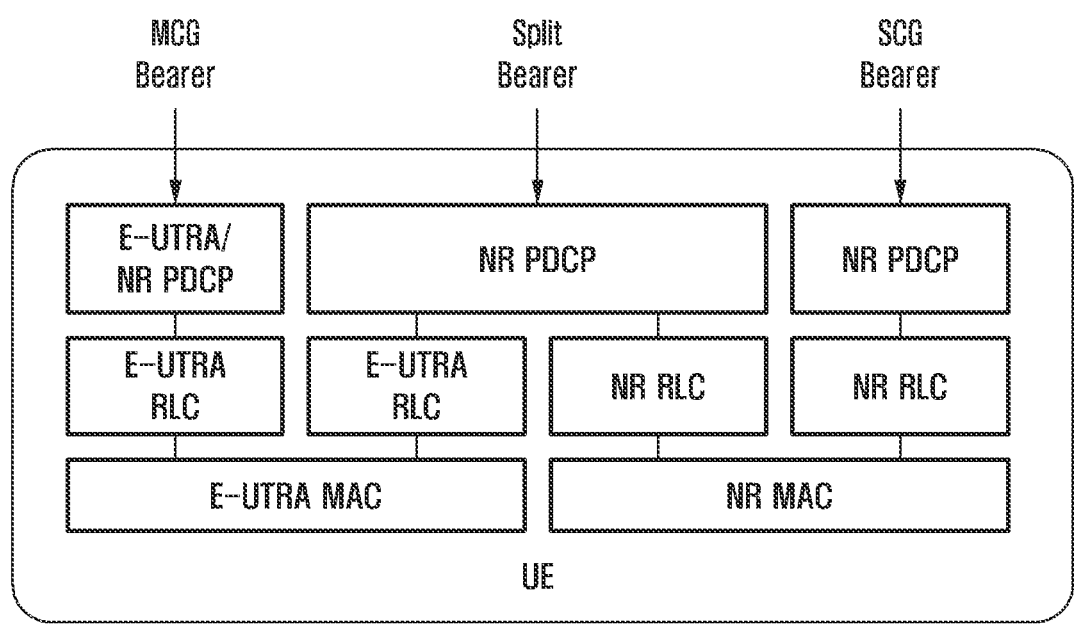
FIG. 7 is a diagram illustrating the structures of split bearers applied to EUTRA NR-dual connectivity (EN-DC), NR EUTRA-dual connectivity (NE-DC), and NR-DC.
Figure 8:
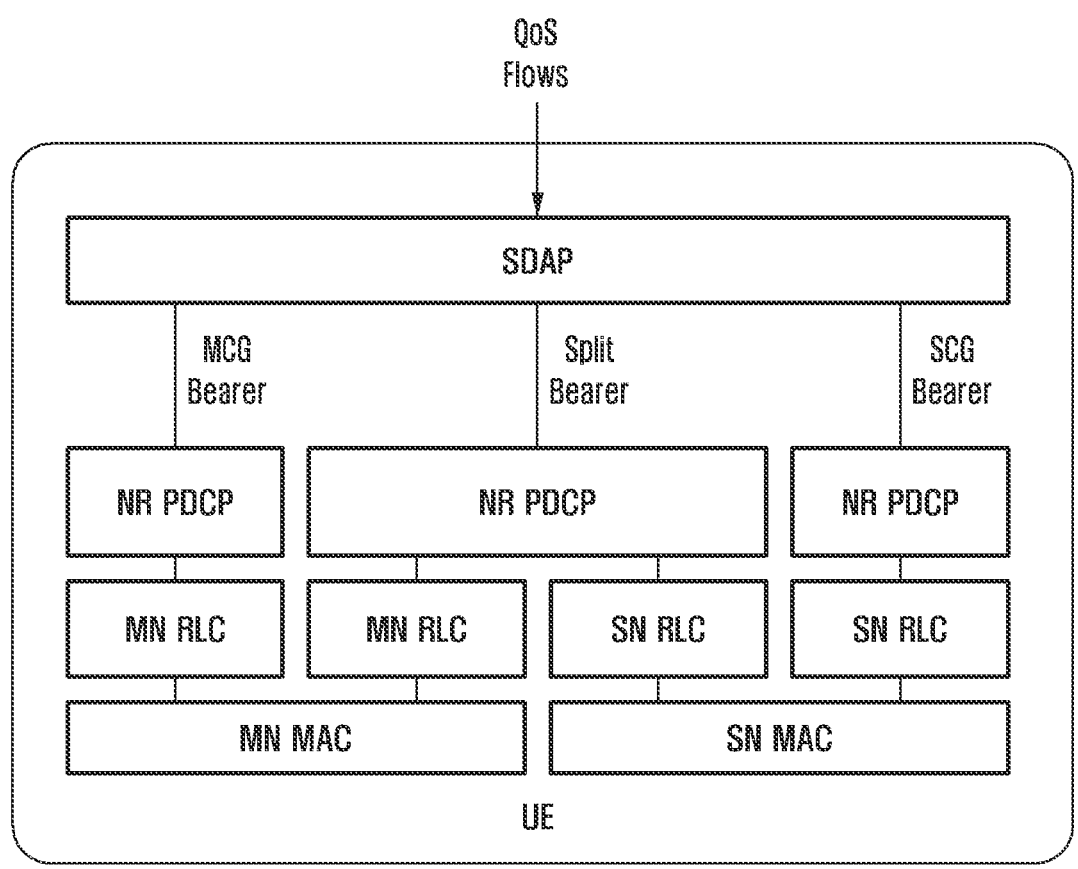
FIG. 8 is a diagram illustrating the structures of split bearers applied to EN-DC, NE-DC, and NR-DC.

```
MCGFailureInformation-r16-IEs ::=    SEQUENCE {
    failureReportMCG-r16                 FailureReportMCG-r16                              OPTIONAL,
    nonCriticalExtension                 SEQUENCE { }                                      OPTIONAL
}
FailureReportMCG-r16 ::=             SEQUENCE {
    failureType-r16                      ENUMERATED {
                                             t310-Expiry, randomAccessProblem
                                             rlc-MaxNumRetx, spare},
    measResultFreqList-r16               MeasResultList2NR,                                OPTIONAL,
    measResultFreqListEUTRA-r16          MeasResultList2EUTRA
OPTIONAL,
    measResultSCG-r16                    OCTET-STRING (CONTAINING MeasResultSCG-Failure)   OPTIONAL,
    measResultSCG-EUTRA-r16              OCTET-STRING                                      OPTIONAL,
    ...
}
MeasResultList2NR ::=                SEQUENCE (SIZE (1..maxFreq)) OF MeasResult2NR
MeasResultList2EUTRA ::=             SEQUENCE (SIZE (1..maxNrofServingCellsEUTRA)) OF MeasResulE2EUTRA
``` and reception from the PDCP (common PDCP) is enabled via separation to each cell group (MCG and SCG) in RLC. For the structure of the split bearer of EN-DC, refer to FIG. 7, and for the structure of a split bearer applied to NE-DC and NR-DC, refer to FIG. 8.

In operation 650, the UE 601 may transfer the MCGFailureInformation message generated in operation 645 to the base station (SCG) 603 via a split SRB1 configured for the SCG. Since failure occurs in the link to the MCG, MCGFailureInformation needs to be transferred to the base station 603 of the SCG, and only in case that the split SRB1 is configured, the MCG and the SCG are capable of processing an RRC message via the same SRB. In other words, in the case in which an split SRB1 is not configured and in the case in which an SRB3 is not configured, the UE may not transfer the MCGFailureInformation message to the base station 603 of the SCG. As described above, embodiment 1 describes only the case in which a split SRB1 is configured. Detailed description of MCGFailureInformation has been described above.

The base station 603 of the SCG that receives the MCGFailureInformation message may transfer the corresponding message to the MCG via an inter-node message (an RRC or Xn message), and the MCG may determine a subsequent operation based thereon. In the case of indicating a handover and PSCell change and the like to the UE 601, the base station 602 of the MCG may generate an RRCReconfiguration message including a reconfigurationWithSync configuration and may transfer the same to the base station 603 of the SCG, and the base station 603 of the SCG may transfer the RRCReconfiguration message received from the MCG to the UE 601 via the SRB1 in operation 655. Alternatively, an RRCRelease message to release the corresponding UE 601 may be transferred, and no message may be transferred so that the UE automatically performs an RRC re-establishment operation. Operation 655 is an operation in which the SCG transfers the RRCReconfiguration message received from the MCG to the UE via the SRB1 among the described operations of the base station, and the corresponding message may include a reconfigurationWithSync configuration. In operation 660, the UE 601 that receives the RRC reconfiguration message may apply the received RRCReconfiguration, and in the case in which an operation such as handover and PSCell change and the like is indicated, the UE 601 may apply the same. In the case of handover, an RRCReconfigurationComplete message may be transferred via the SRB1 of a target cell 604.

Figure 9:
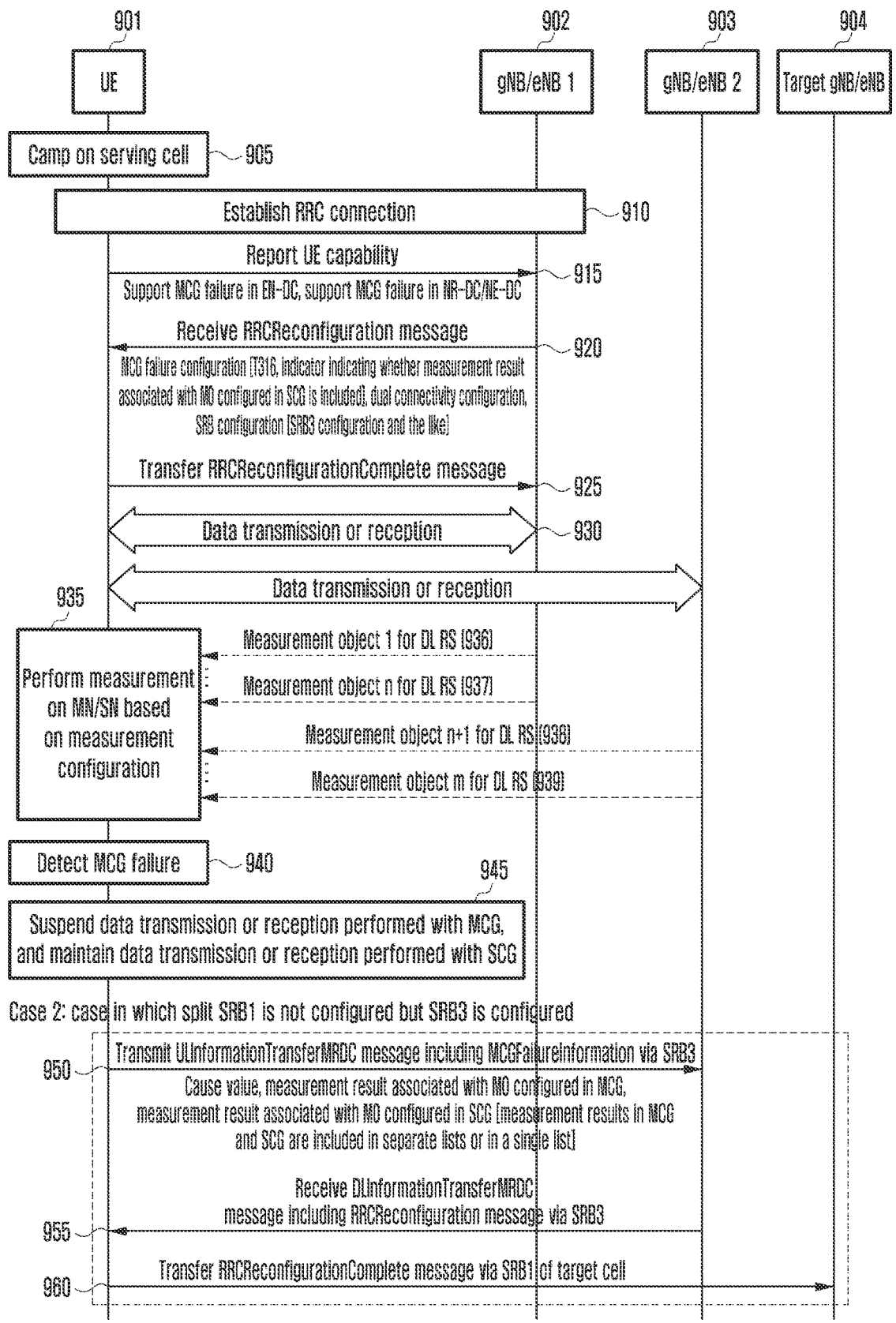
FIG. 9 is a diagram illustrating, as embodiment 2 of the disclosure, the entire procedure in which a UE reports an MCG failure and receives and applies a response message thereto in case that a split SRB of an SRB1 is not configured and an SRB3 is configured.

FIG. 9 is a diagram illustrating, as embodiment 2 of the disclosure, the entire procedure in which a UE reports an MCG failure and receives and applies a response message thereto in case that a split SRB of an SRB1 is not configured and an SRB3 is configured. In the embodiment of FIG. 9, an MCG may be used interchangeably with a base station of the MCG and a serving base station of the MCG, and an SCG may be used interchangeably with a base station of the SCG and a serving base station of the SCG.

In operation 901, the UE 905 may camp on a predetermined base station, may receive system information from a corresponding serving cell, and may prepare for a connected state. Subsequently, for a predetermined reason, an RRC connection procedure with a corresponding serving cell (MCG) 902 may be performed in operation 910. In operation 915, a request for reporting of UE capability is received via an UECapabilityEnquiry message from the base station 902, and an UECapabilityInformation message including UE capability information of UE itself is transferred to the base station 902 in response thereto. The corresponding UE capability information message may include UE capability associated with whether MCG failure reporting and recovery is supported. This may be transferred in one bit for each UE, or may indicate capability associated with a predetermined RAT type. For example, one bit supporting MCG failure reporting and recovery in EN-DC and one bit supporting MCG failure reporting and recovery in NR-DC and NE-DC may be respectively indicated, or one bit supporting MCG failure reporting and recovery in EN-DC may include UE capability in NR-DC and NE-DC and may be indicated. The base station 902 that identifies the UE information may determine that the corresponding UE 901 is capable of transferring an MCG failure report message to the base station 902 in case that an MCG failure occurs (since an MCG failure occurs, the message may be transferred to an MCG base station via an SCG), and later on, in the case of instructing handover and connection release based on the corresponding information, the base station 902 may be aware that the corresponding operation is capable of being applied.

Based on the UE capability report in this operation, the base station 902 may transfer an RRC reconfiguration message to the UE in operation 920, and the corresponding message may include a radio bear configuration, an SCell addition and change, a dual connectivity configuration, a measurement configuration, and the like. Particularly, in the drawing, a DC configuration (SCG configuration), a radio bearer configuration (a DRB configuration, an SRB configuration, particularly, an SRB3 configuration, and the like), and MCG failure-related configuration information for quick MCG recovery (T316, an indicator including a measurement result associated with an MO configured in the SCG) may be provided in the corresponding operation. The T316 timer is a guard timer up to performing of an RRC re-establish operation after declaration of an MCG failure, and is triggered in case that the UE transmits MCGFailureInformation, and the UE may perform RRC re-establish operation in case that the corresponding timer expires. This may be construed as the time in which the UE is awaiting a response from the base station in response to the MCGFailureInformation during a predetermined period of time. For reference, the description associated with the T316 timer is as shown in Table 3. In operation 925, the UE 901 may transfer, to base station 902, an RRC reconfiguration complete message to the base station 902 in order to confirm that reception of the RRC reconfiguration message is completed and the corresponding configuration is applied. Subsequently, the UE 901 may perform data transmission or reception with the base station 902 by applying configured information in operation 930, and may perform channel measurement on a serving cell and neighboring cells according to a measurement configuration configured during the RRC reconfiguration in operation 935. In this instance, the measurement configuration may correspond to measurement objects (MO) 936 and 937 of a serving frequency and an adjacent frequency that are configured by an MN, and measurement objects (MO) 938 and 939 of a serving frequency and an adjacent frequency that are configured by an SN, and the UE 901 may perform measurement on a configured MO, may apply a measurement value, and may report the same in a predetermined situation.

In operation 940, the UE 901 that supports an MCG recovery and failure reporting in a predetermined situation may identify a problem in a connection state associated with the MCG and may declare an MCG failure. The predetermined situation may be the expiration of a T310 timer, a random access failure, the case in which the number of RLC retransmissions exceeds the maximum number of RLC retransmissions, and the like. For reference, the description associated with the T310 timer is as shown in Table 4. The UE 901 that triggers the MCG failure may declare the MCG failure in this operation, and may generate MCGFailureInformation in operation 945, and the corresponding message may include at least one among a measurement value of an MCG frequency (e.g., NR), a cause of the MCG failure, a measurement value of an SCG frequency (e.g., LTE), a measurement value of a non-serving cell, and the like. In addition, the measurement values of the MCG and SCG frequencies may be reported separately depending on which of the MCG and the SCG performs configuration, or an MCG frequency measurement value and an SCG frequency measurement value may be reported irrespective of a cell group that performs configuration. That is, measurement results of MOs configured by the MCG and SCG may be included in separate lists or a single list. In addition, in this operation, the UE 901 may suspend data transmission or reception performed with the MCG and may maintain data transmission or reception performed with the SCG. For the structure of MCGFailureInformation and the related descriptions thereof, refer to Table 5 and Table 6. The following is an example in which measurement results configured by the MCG and SCG are included in separate lists.

A measurement list configured by an MCG: measResultFreqList-r16, measResultFreqListEUTRA-r16

A measurement list configured by an SCG: measResultSCG-r16, measResultSCG-EUTRA-r16 (the corresponding fields may be included in the measurement list configured by an MCG, and may be transferred, and in that case, the corresponding fields are not needed)

In the present embodiment, the following describes the case in which the base station 902 configures DC for the UE 901 and configures only an SRB3, as opposed to configuring a split bearer of an SRB1, that is, split SRB1 in operation 920. In operation 950, the UE 901 may encapsulate the MCGFailureInformation message generated in the previous operation in a ULInformationTransferMRDC message, and may transfer the same to the base station (SCG) 903 via the SRB3 configured for the SCG. Since failure occurs in the link to the MCG, MCGFailureInformation needs to be transferred to the SCG. Since a split SRB1 is not configured, the transferring may be performed via the SRB3, and ULInformationTransferMRDC may be used for the transferring, which is a new RRC message that is the RRC message of the SCG, as opposed to the RRC message of the MCG. MCGFailureInformation that actually needs to be transferred to the MCG may be included in the ULInformationTransferMRDC message, and the SCG base station 903 that receives ULInformationTransferMRDC message from the UE 901 may extract the MCGFailureInformation message from the corresponding message and may transfer the same to the MCG. As described above, embodiment 2 describes the case in which the split SRB1 is not configured and only the SRB3 is configured. The MCG may receive the MCGFailureInformation via an inter node RRC or an Xn message, and may interpret the same so as to determine a subsequent operation.

In the case of indicating a handover and PSCell change and the like to the UE 901, the base station 902 of the MCG may generate an RRCReconfiguration message including a reconfigurationWithSync configuration and may transfer the same to the base station 903 of the SCG, and the base station 903 of the SCG may transfer the RRCReconfiguration message received from the MCG to the UE 901 via the SRB3. Alternatively, an RRCRelease message to release the corresponding UE 901 may be transferred, and no message may be transferred so that the UE 901 automatically performs an RRC re-establishment operation. Operation 955 is an operation in which the base station 903 of the SCG generates a DLInformationTransferMRDC message including the RRCReconfiguration message received from the MCG, and transfers the same to the UE 901 via the SRB3, among the above-described operations, and the corresponding RRCReconfiguration message may include a reconfigurationWithSync configuration. In operation 960, the UE 901 that receives the RRC reconfiguration message may apply the received RRCReconfiguration, and in the case in which an operation such as handover and PSCell change and the like is indicated, the UE 901 may apply the same. In the case of handover, an RRCReconfigurationComplete message may be transferred via the SRB1 of a target cell. However, in the case in which a handover is not indicated by the RRC reconfiguration message, the UE 901 may transfer an RRCReconfigurationComplete message via the SRB3 via which the RRC reconfiguration message is received.

Table 7 shows the structure of ULInformationTransferMRDC, and Table 8 is the field description of the information elements of Table 7. Table 9 shows the structure of DLInformationTransferMRDC, and Table 10 is the field description of the information elements of Table 9.

TABLE 7

```
ULInformationTransferMRDC-IEs::=   SEQUENCE {
   ul-DCCH-MessageNR              OCTET STRING   OPTIONAL,
   ul-DCCH-MessageEUTRA           OCTET STRING   OPTIONAL,
   lateNonCriticalExtension       OCTET STRING   OPTIONAL,
   nonCriticalExtension           SEQUENCE { }   OPTIONAL
}
```

TABLE 8

ULInformationTransferMRDC field descriptions ul-DCCH-MessageNR

Includes the UL-DCCH-Message. In this version of the specification, the field is only used to transfer the NR RRC MeasurementReport and FaliureInformation messages when sent via SRB1 and to transfer the NR MCGFailureInformation message when sent via SRB3.

ul-DCCHMessageEUTRA

Includes the UL-DCCH-Message. In this version of the specification, the field is only used to transfer the E-UTRA RRC MeasurementReport and FailureInformation messages when sent via SRB1 and to transfer the E-UTRA MCGFailureInformation message when sent via SRB3.

TABLE 9

```
DLInformationTransferMRDC-r16-IEs::=   SEQUENCE {
   dl-DCCH-MessageNR-r16              OCTET STRING   OPTIONAL,
   dl-DCCH-MessageENRUTRA-r16         OCTET STRING   OPTIONAL,
   lateNonCriticalExtension           OCTET STRING   OPTIONAL,
   nonCriticalExtension               SEQUENCE { }   OPTIONAL
}
```

TABLE 10

DLInformationTransferWROC field descriptions dl-DCCH-MessageNR

Includes the DL-DCCH-Message. In this version of the specification, the field is only used to transfer the NRRRCReconfiguration and RRCRelease messages.

dl-DCCH-MessageEUTRA

Includes the DL-DCCH-Messagage. In this version of the specification, the field is only used to transfer the E-UTRA RRC RRCConnectionReconfiguration and RRCConnectonRelease messages as specified in TS 36.331 [10].

Figure 10:
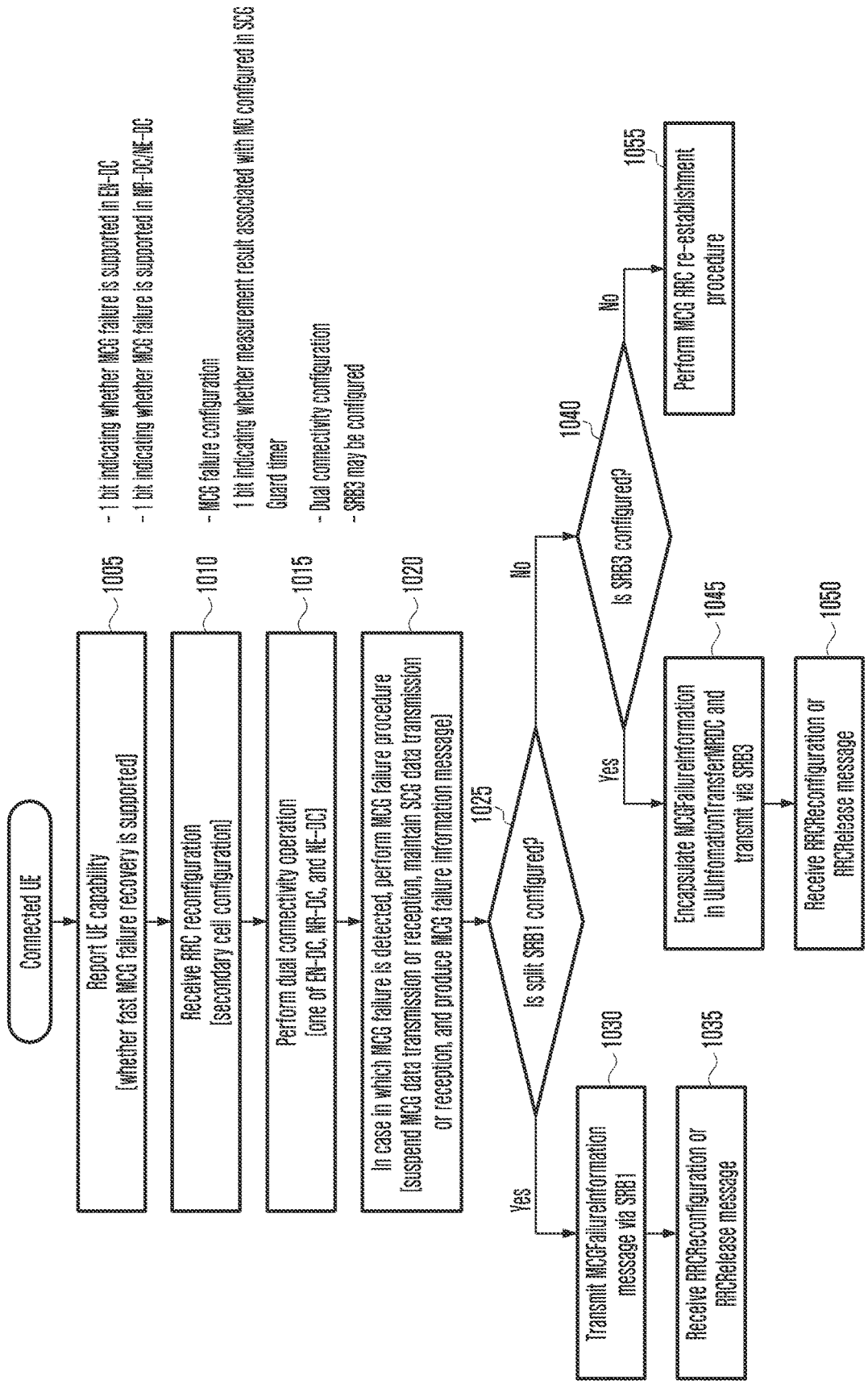
FIG. 10 is a diagram illustrating, as a first UE operation applied to embodiments of the disclosure, a UE operation that transfers an MCGFailureInformation message according to a configured SRB type.

FIG. 10 is a diagram illustrating, as a first UE operation applied to embodiments of the disclosure, a UE operation that transfers an MCGFailureInformation message according to a configured SRB type.

In operation 1005, the UE may receive a request for reporting of UE capability from a base station via a UECapabilityEnquiry message, and may transfer a UECapabilityInformation message including the UE capability information of UE itself in response thereto. The corresponding UE capability information message may include UE capability associated with whether MCG failure reporting and recovery is supported. This may be transferred in one bit for each UE, or may indicate capability associated with a predetermined RAT type. For example, one bit supporting MCG failure reporting and recovery in EN-DC and one bit supporting MCG failure reporting and recovery in NR-DC and NE-DC may be respectively indicated, or one bit supporting MCG failure reporting and recovery in EN-DC may include UE capability in NR-DC and NE-DC and may be indicated. The base station that identifies the UE information may determine that the corresponding UE is capable of transferring an MCG failure report message to the base station in case that an MCG failure occurs, and later on, in the case of instructing handover and connection release based on the corresponding information, the base station may be aware that the corresponding operation is capable of being applied.

In operation 1010, the UE may receive an RRC reconfiguration message from the base station and the corresponding message may include a radio bearer configuration, an SCell addition and change, a dual connectivity configuration (SCG configuration), a measurement configuration, and the like. Particularly, a DC configuration (an SCG configuration), a radio bearer configuration (a DRB configuration, an SRB configuration, particularly, an SRB3 configuration, and the like), and MCG failure-related configuration information for quick MCG recovery (T316, an indicator including a measurement result associated with an MO configured in an SCG) may be provided in the corresponding operation according to an embodiment of the disclosure. The T316 timer is a guard timer up to performing of an RRC re-establish operation after declaration of an MCG failure, and is triggered in case that the UE transmits MCGFailureInformation, and the UE may perform RRC re-establish operation in case that the corresponding timer expires. This may be construed as the time in which the UE is awaiting a response from the base station in response to MCGFailureInformation during a predetermined period of time.

In operation 1015, the UE may perform a DC operation, channel measurement, and data transmission or reception based on the configurations in operation 1010.

In operation 1020, the UE may identify a problem in a connection state for a predetermined reason, and may declare an MCG failure. The predetermined situation may be the expiration of a T310 timer, a random access failure, the case in which the number of RLC retransmissions exceeds the maximum number of RLC retransmissions, and the like. Particularly, after the MCG failure is declared, an MCG failure procedure may be performed. That is, MCGFailureInformation may be generated, and the corresponding message may include a measurement value of an MCG frequency (e.g., NR), a cause of the MCG failure, a measurement value of an SCG frequency (e.g., LTE), a measurement value of a non-serving cell, and the like. In addition, the measurement values of the MCG and SCG frequencies may be reported separately depending on which of the MCG and the SCG performs configuration, or an MCG frequency measurement value and an SCG frequency measurement value may be reported irrespective of a cell group that performs configuration. That is, measurement results of MOs configured by the MCG and SCG may be included in separate lists or a single list. In addition, in this operation, the UE may suspend data transmission or reception performed with the MCG and may maintain data transmission or reception performed with the SCG. The following is an example in which measurement results configured by the MCG and SCG are included in separate lists.

A measurement list configured by an MCG: measResultFreqList-r16, measResultFreqListEUTRA-r16

A measurement list configured by an SCG: measResultSCG-r16, measResultSCG-EUTRA-r16 (the corresponding fields may be included in the measurement list configured by the MCG, and may be transferred, and in that case, the corresponding fields are not needed)

In operation 1025, the UE may identify whether a split SRB1 is configured in the SCG, and may perform a different operation.

In the case in which a split SRB1 of the SCG is configured in the RRCReconfiguration message configured in operation 1010, the UE may transfer the MCGFailureInformation message generated in a previous operation to the SCG via a configured SRB1 in operation 1030. At the same time, a configured T316 timer operates. Subsequently, in the case in which the RRCReconfiguration message or an RRCRelease message is received from the SCG, an operation of applying the same may be performed. If the T316 timer expires, the UE may proceed with an RRC re-establishment operation in operation 1035.

In the case in which a split SRB1 of the SCG is not configured in the RRCReconfiguration message configured in operation 1010, the UE may identify whether an SRB3 is configured in operation 1040. In the case in which the SRB3 is configured, the UE may include the MCGFailureInformation message generated in a previous operation in a ULInformationTransferMRDC message, and may transfer the same to the SCG via the configured SRB3 in operation 1045. At the same time, a configured T316 timer operates. Subsequently, in the case in which an RRCReconfiguration message or an RRCRelease message is received from the SCG, an operation of applying the same may be performed. If the T316 timer expires, the UE may proceed with an RRC re-establishment operation in operation 1050. In the case in which it is identified that a split SRB1 is not configured and an SRB3 is not configured in operation 1040, the UE may perform an RRC re-establishment operation with respect to the MCG. In this instance, although it is expressed as operation 1055 in the drawing, the corresponding condition is recognized after operation 1010 and thus, in the case in which a problem in the connection to the MCG is detected in operation 1020, subsequent operations may be all omitted and the MCG RRC re-establishment operation may be immediately performed.

Figure 11:
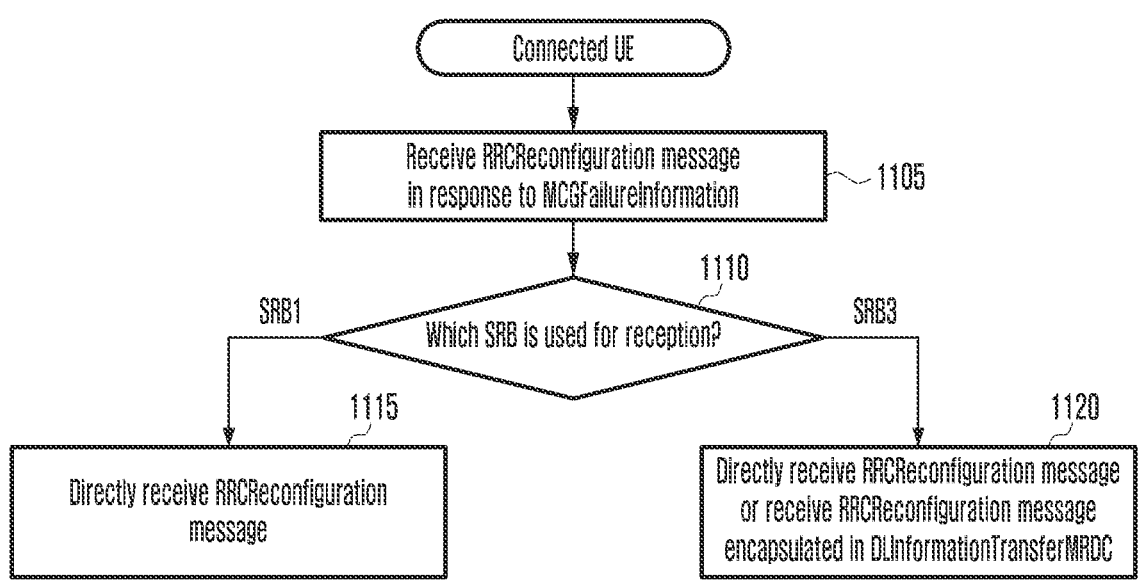
FIG. 11 is a diagram illustrating, as a second UE operation applied to embodiments of the disclosure, a UE operation performed depending on an SRB via which an RRCReconfiguration message is received in response to MCGFailureInformation.

FIG. 11 is a diagram illustrating, as a second UE operation applied to embodiments of the disclosure, a UE operation performed depending on an SRB via which an RRCReconfiguration message is received in response to MCGFailureInformation. The corresponding drawing shows operations connected with FIG. 10, and illustrates only predetermined operations. That is, operations performed after the UE transfers the MCGFailureInformation in the operations of FIG. 10 is illustrated.

In operation 1105, the UE may receive an RRCReconfiguration message in response to the MCGFailureInformation message that the UE transfers to an SCG, and the corresponding message may include a reconfigurationWithSync configuration. The reconfigurationWithSync may include at least one piece of information among information indicating a handover or PSCell change. In operation 1110, the UE may identify an SRB via which the RRCReconfiguration message is received in response to the MCGFailureInformation message. In the case in which reception is performed via an SRB1 (i.e., reception via a split SRB1), the UE may directly receive the corresponding RRCReconfiguration message in operation 1115. However, reception is performed via an SRB3, as opposed to an SRB1, the RRCReconfiguration message may be directly received, or the RRCReconfiguration message may be encapsulated in a DLInformationTransferMRDC message, in operation 1120.

A subsequent UE operation will be described in detail with reference to FIG. 12.

Figure 12:
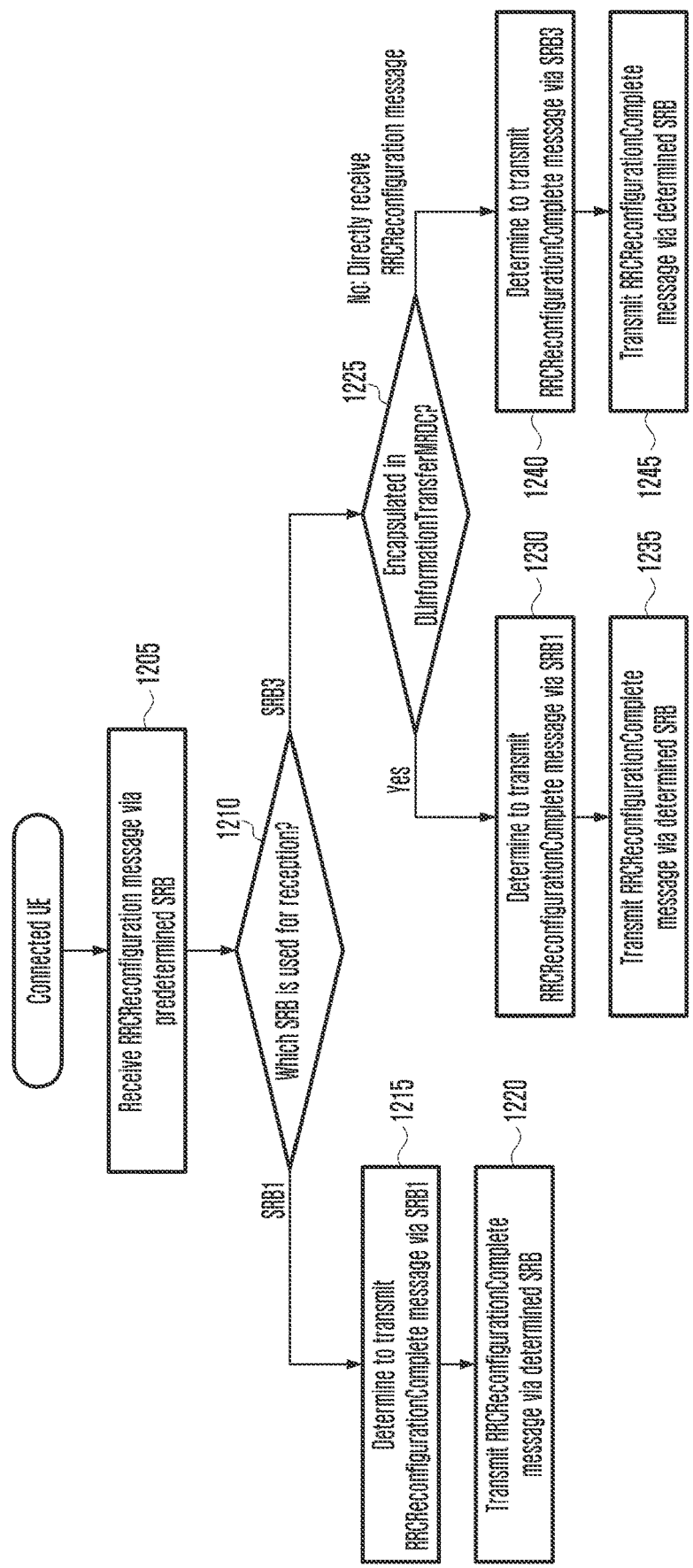
FIG. 12 is a diagram illustrating, as a third UE operation applied to embodiments of the disclosure, a subsequent UE operation performed depending on an SRB via which an RRCReconfiguration message is received in response to MCGFailureInformation, and depending on the type of RRCReconfiguration message transferred.

FIG. 12 is a diagram illustrating, as a third UE operation applied to embodiments of the disclosure, a subsequent UE operation performed depending on an SRB via which an RRCReconfiguration message is received in response to MCGFailureInformation, and depending on the type of RRCReconfiguration message transferred.

A UE may receive an RRCReconfiguration message via a predetermined SRB in operation 1205, and may determine an operation depending on an SRB via which reception is performed in operation 1210. In the case in which the RRCReconfiguration message is received via an SRB1, the UE may determine to transmit an RRCReconfigurationComplete message via the SRB1 via which reception is performed in operation 1215, may generate the message, and may transfer the corresponding RRCReconfigurationComplete message to the base station via the SRB1 in operation 1220. This may be a normal UE operation irrespective of an MCG and an SCG.

In the case in which the UE receives the RRCReconfiguration message or a DLInformationTransferMRDC message including the RRCReconfiguration via an SRB3 in operation 1210, the UE may perform an operation differently by distinguishing the cases. This may be determined in operation 1225, and in the case in which the RRCReconfiguration is included in the DLInformationTransferMRDC and is transferred, operation 1230 may be performed. The UE may apply a configuration of the received RRCReconfiguration message, may apply handover and PSCell change included in the corresponding message, and then, may determine to transmit an RRCReconfigurationComplete message via the SRB1 of a target cell to which handover is performed. The UE may generate the RRCReconfigurationComplete message, and may transfer the corresponding RRCReconfigurationComplete message to a target base station via the SRB1 in operation 1235. In the case in which it is identified that the UE directly receives the RRCReconfiguration message via the SRB3, as opposed to receiving the DLInformationTransferMRDC, in operation 1225, the UE may proceed with operation 1240. In operation 1240, the UE may determine to transmit an RRCReconfigurationComplete message via the SRB3 via which the RRC reconfiguration message is received. The UE may generate the RRCReconfigurationComplete message, and may transfer the corresponding RRCReconfigurationComplete message to an SCG via the SRB3 in operation 1245. This may be a normal UE operation irrespective of an MCG and an SCG.

Figure 13:
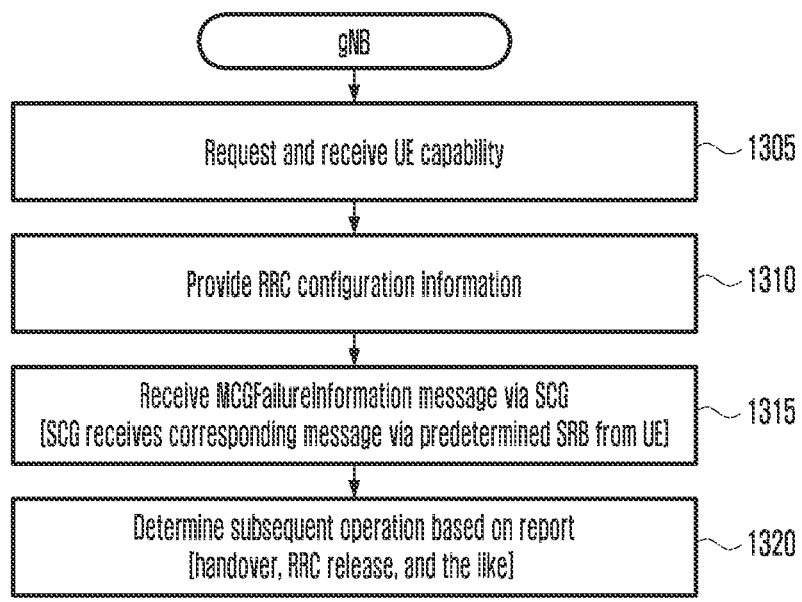
FIG. 13 is a diagram illustrating a base station operation applied to the whole embodiments of the disclosure.

FIG. 13 is a diagram illustrating a base station operation applied to the whole embodiments of the disclosure.

In operation 1305, a base station requests a UE in a connected state to report UE capability via a UECapabilityEnquiry message, and receives the UE capability information via an UECapabilityInformation message in response thereto. The corresponding UE capability information may include UE capability associated with whether MCG failure reporting and recovery is supported. This may be transferred in one bit for each UE, or may indicate capability associated with a predetermined RAT type. For example, one bit supporting MCG failure reporting and recovery in EN-DC and one bit supporting MCG failure reporting and recovery in NR-DC and NE-DC may be respectively indicated, or one bit supporting MCG failure reporting and recovery in EN-DC may include UE capability in NR-DC and NE-DC and may be indicated. The base station that identifies the UE information may determine that the corresponding UE is capable of transferring an MCG failure report message to the base station in case that an MCG failure occurs, and later on, in the case of instructing handover and connection release based on the corresponding information, the base station may be aware that the corresponding operation is capable of being applied.

Subsequently, the base station may generate and transmit an RRCReconfiguration message in consideration of the UE capability in operation 1310, and the corresponding message may include a radio bearer configuration, an SCell addition and change, a dual connectivity configuration (SCG configuration), a measurement configuration, and the like. Particularly, a DC configuration (an SCG configuration), a radio bearer configuration (a DRB configuration, an SRB configuration, particularly, an SRB3 configuration, and the like), and MCG failure-related configuration information for quick MCG recovery (T316, an indicator including a measurement result associated with an MO configured in an SCG) may be provided in the corresponding operation in an embodiment of the disclosure. The T316 timer is a guard timer up to performing of an RRC re-establish operation after declaration of an MCG failure, and is triggered in case that the UE transmits MCGFailureInformation, and the UE may perform RRC re-establish operation in case that the corresponding timer expires. This may be construed as the time in which the UE is awaiting a response from the base station in response to MCGFailureInformation during a predetermined period of time.

In operation 1315, the base station may receive an MCGFailureinformation message from the SCG. The SCG may receive the corresponding message from the UE via a predetermined SRB, and there are the case of reception via an SRB1 and the case of reception via an SRB3. In the case of reception via an SRB1, MCGFailureinformation may be directly transferred. In the case of reception via an SRB3, the MCGFailureinformation message may be included in an ULInformationTrnasferMRDC and may be transferred.

In operation 1320, based on the received MCGFailureinformation information, the base station may determine whether to apply the same, and may determine a subsequent operation. Based on the determination, the base station of the MCG may transfer RRC reconfiguration with respect to the UE. That is, in the case of indicating, to the UE, a handover and PSCell change based on the MCGFailureinformation information, the MCG base station may generate and transfer an RRCReconfiguration message, and may transfer an RRC release message so as to indicate RRCRelease to the corresponding UE. The message generated by the MCG may be transferred to the UE via the SCG. Alternatively, no operation may be performed so that the UE automatically performs an RRC re-establishment operation. This is because the UE performs an RRC re-establishment operation in case that the T316 timer expires.

Figure 14:
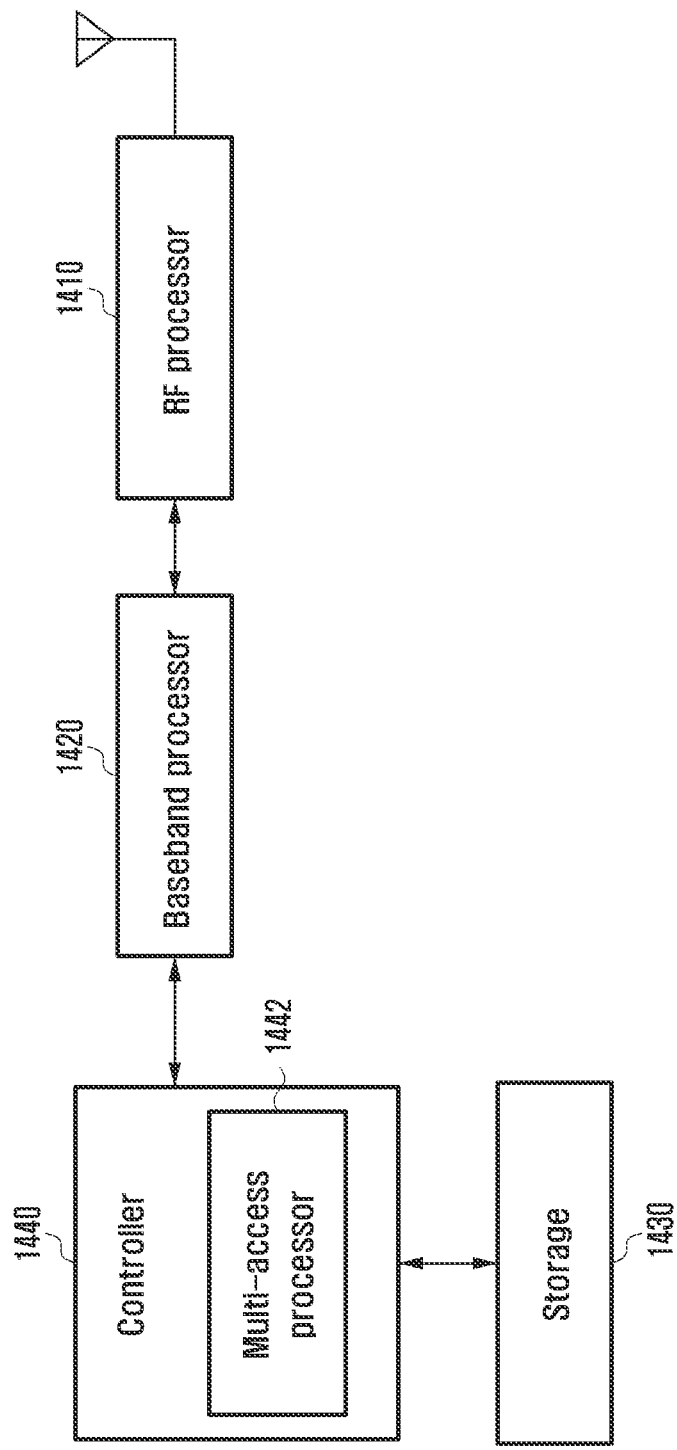
FIG. 14 is a diagram illustrating the configuration of a UE according to an embodiment of the disclosure.

FIG. 14 is a diagram illustrating the configuration of a UE according to an embodiment of the disclosure.

Referring to the drawing, the UE includes a radio frequency (RF) processor 1410, a baseband processor 1420, a storage 1430, and a controller 1440. The controller 1440 may further include a multi-access processor 1442.

The RF processor 1410 performs a function of transmitting or receiving a signal via a wireless channel, such as band conversion and amplification of a signal. That is, the RF processor 1410 up-converts a baseband signal provided from the baseband processor 1420 into an RF band signal, transmits the RF band signal via an antenna, and down-converts the RF band signal received via the antenna into a baseband signal. For example, the RF processor 1410 may include a transmission filter, a reception filter, an amplifier, a mixer, an oscillator, a digital to analog converter (DAC), an analog to digital converter (ADC), and the like. Although only a single antenna is illustrated in the drawing, the UE may include a plurality of antennas. In addition, the RF processor 1410 may include a plurality of RF chains. Moreover, the RF processor 1410 may perform beamforming. For the beamforming, the RF processor 1410 may control the phase and the size of each signal transmitted or received via a plurality of antennas or antenna elements. In addition, the RF processor may perform MIMO, and may receive multiple layers in case that performing a MIMO operation.

The baseband processor 1420 executes a function of converting between a baseband signal and a bitstring according to the physical layer standard of a system. For example, in the case of data transmission, the baseband processor 1420 encodes and modulates a transmission bitstring, so as to generate complex symbols. In addition, in the case of data reception, the baseband processor 1420 restores a reception bitstring by demodulating and decoding a baseband signal provided from the RF processor 1410. For example, according to an orthogonal frequency division multiplexing (OFDM) scheme, in the case of data transmission, the baseband processor 1420 generates complex symbols by encoding and modulating a transmission bitstring, maps the complex symbols to subcarriers, and then configures OFDM symbols via an inverse fast Fourier transform (IFFT) operation and cyclic prefix (CP) insertion. Further, in the case of data reception, the baseband processor 1420 divides the baseband signal provided from the RF processor 1410 in units of OFDM symbols, reconstructs the signals mapped to the subcarriers via a fast Fourier transform (FFT) operation, and then reconstructs a reception bitstring via demodulation and decoding.

The baseband processor 1420 and the RF processor 1410 transmit and receive signals as described above. Accordingly, the baseband processor 1420 and the RF processor 1410 may be referred to as a transmitter, a receiver, a transceiver, or a communication unit. Furthermore, at least one of the baseband processor 1420 and the RF processor 1410 may include a plurality of communication modules in order to support different multiple radio access technologies. In addition, at least one of the baseband processor 1420 and the RF processor 1410 may include different communication modules to process signals of different frequency bands. For example, the different radio access technologies may include a wireless LAN (e.g., IEEE 802.11), a cellular network (e.g., LTE), and the like. Further, the different frequency bands may include a super high frequency (SHF) (e.g., 2.NRhz, NRhz) band and a millimeter (mm) wave (e.g., 60 GHz) band.

The storage 1430 stores data such as a basic program, an application program, configuration information, and the like for the operation of the UE. Particularly, the storage 1430 may store information related to a second access node that performs wireless communication using a second radio access technology. In addition, the storage 1430 provides data stored therein by request of the controller 1440.

The controller 1440 controls the overall operation of the UE. For example, the controller 1440 transmits or receives a signal via the baseband processor 1420 and the RF processor 1410. In addition, the controller 1440 may record data in the storage 1430 and read the data therefrom. To this end, the controller 1440 may include at least one processor. For example, the controller 1440 may include a communication processor (CP) that performs control for communication, and an application processor (AP) that controls a higher layer such as an application program. The controller 1440 may control the operation of a UE according to various embodiments of the disclosure. For example, the controller 1440 may perform control so as to generate master cell group (MCG) failure information, to transmit the MCG failure information to a base station of a secondary cell group (SCG), to receive a radio resource control (RRC) reconfiguration message from the base station, and to transmit an RRC reconfiguration complete message based on the RRC reconfiguration message. In the case in which the RRC reconfiguration message is included in a downlink information transfer message and is received via a signaling radio bearer (SRB) 3 of an SCG, the RRC reconfiguration complete message may be transmitted via an SRB1 configured based on the RRC reconfiguration message. The downlink information transfer message may correspond to downlink (DL) information transfer multi radio (MR) dual connectivity (DC) message.

In addition, in the case in which the RRC reconfiguration message is not included in the downlink information transfer message and is received via the SRB3, the controller 1440 may perform control so that the RRC reconfiguration complete message is transmitted via the SRB3. In the case in which the RRC reconfiguration message is received via a split SRB1, the controller 1440 may perform control so that the RRC reconfiguration complete message is transmitted via an SRB1 configured based on the RRC reconfiguration message.

The RRC reconfiguration message may include handover information, and the SRB1 may be the SRB1 of a target cell that is configured based on the handover information. In addition, in the case in which a split SRB1 is configured, the controller 1440 may perform control so as to transmit the MCG failure information to the base station via the split SRB1. In addition, in the case in which the SRB3 is configured, the controller 1440 may perform control so as to include the MCG failure information in an uplink information transfer message and to transmit the same via the SRB3. In addition, the controller 1440 may perform control so that information indicating whether MCG failure recovery is supported is reported via UE capability information.

Figure 15:
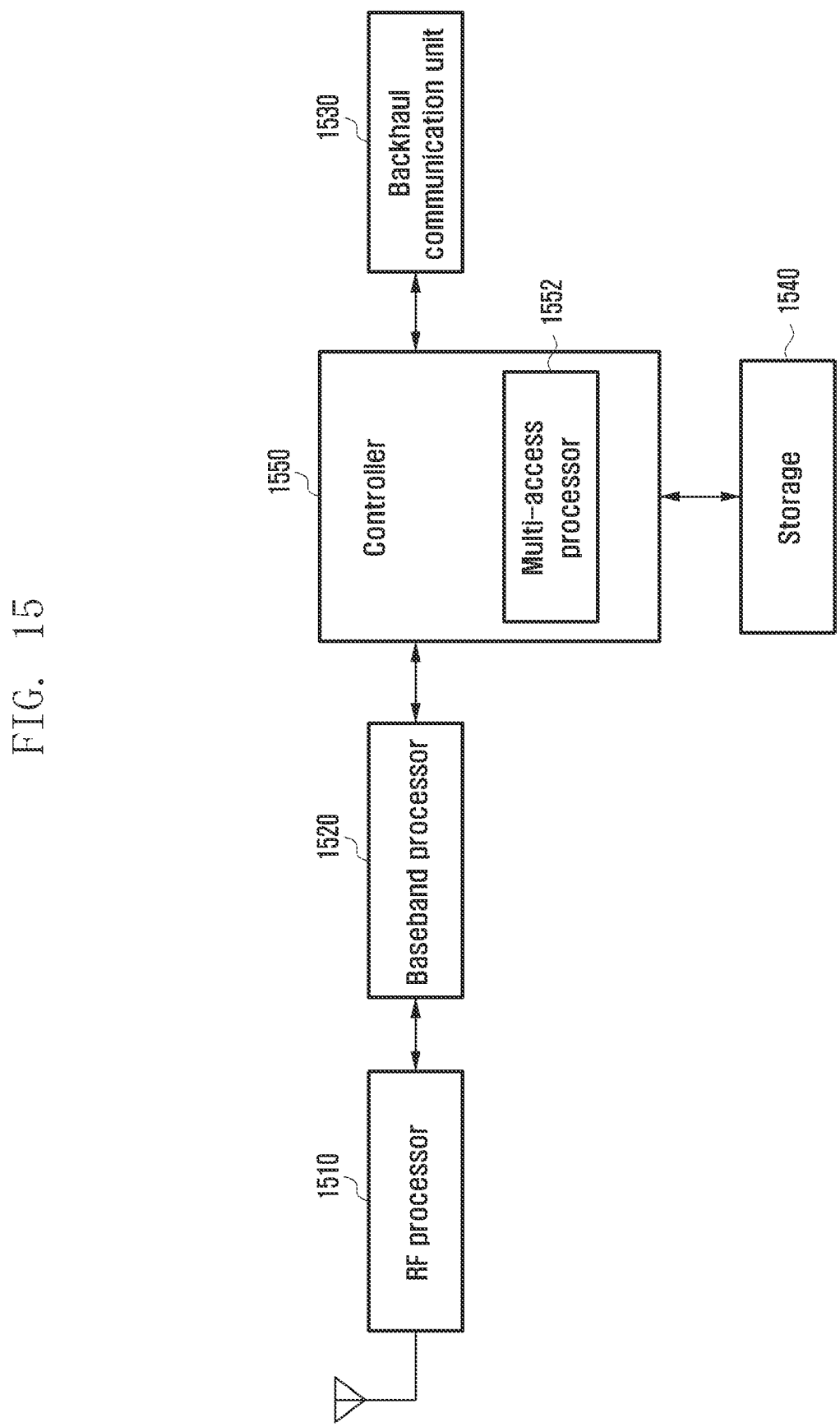
FIG. 15 is a diagram illustrating the configuration of a base station according to an embodiment of the disclosure.

FIG. 15 is a diagram illustrating the configuration of a base station according to an embodiment of the disclosure.

As illustrated in the drawing, the base station may include an RF processor 1510, a baseband processor 1520, a backhaul communication unit 1530, a storage 1540, and a controller 1550. The controller 1550 may further include a multi-access processor 1552.

The RF processor 1510 performs a function of transmitting or receiving a signal via a wireless channel, such as band conversion and amplification of a signal. That is, the RF processor 1510 up-converts a baseband signal provided from the baseband processor 1520 into an RF band signal, transmits the RF band signal via an antenna, and down-converts the RF band signal received via the antenna into a baseband signal. For example, the RF processor 1510 may include a transmission filter, a reception filter, an amplifier, a mixer, an oscillator, a DAC, an ADC, and the like. Although only a single antenna is illustrated in the drawing, the first access node may include a plurality of antennas. In addition, the RF processor 1510 may include a plurality of RF chains. Moreover, the RF processor 1510 may perform beamforming. For the beamforming, the RF processor 1510 may control the phase and the size of each of the signals transmitted or received via a plurality of antennas or antenna elements. The RF processor may perform a downlink MIMO operation by transmitting one or more layers.

The baseband processor 1520 performs a function of conversion between a baseband signal and a bitstring according to the physical layer standard of a first radio access technology. For example, in the case of data transmission, the baseband processor 1520 encodes and modulates a transmission bitstring, so as to generate complex symbols. In addition, in the case of data reception, the baseband processor 1520 restores a reception bitstring by demodulating and decoding a baseband signal provided from the RF processor 1510. For example, according to the OFDM scheme, in the case of data transmission, the baseband processor 1520 may generate complex symbols by encoding and modulating a transmission bitstring, may map the complex symbols to subcarriers, and then, may configure OFDM symbols via an IFFT operation and CP insertion. In addition, in the case of data reception, the baseband processor 1520 divides a baseband signal provided from the RF processor 1510 in units of OFDM symbols unit, restores signals mapped onto the subcarriers via an FFT operation, and restores a reception bitstring via demodulation and decoding. The baseband processor 1520 and the RF processor 1510 transmit and receive signals as described above. Accordingly, the baseband processor 1520 and the RF processor 1510 may be referred to as a transmitter, a receiver, a transceiver, a communication unit, or a wireless communication unit.

The backhaul communication unit 1530 may provide an interface for performing the communication with other nodes in a network. That is, the backhaul communication unit 1530 may convert, into a physical signal, a bitstring transmitted from the master base station to another node, for example, a secondary base station, a core network, and the like, and may convert a physical signal received from the other node into a bitstring.

The storage 1540 stores data such as a basic program, an application program, configuration information, and the like for the operation of the master base station. Particularly, the storage 1540 may store information associated with a bearer allocated to a connected UE, a measurement result reported from a connected UE, and the like. In addition, the storage 1540 may provide multiple accesses to a UE, or may store information which is a criterion for determining whether to suspend connection. In addition, the storage 1540 provides data stored therein by request of the controller 1550.

The controller 1550 may control the overall operation of the master base station. For example, the controller 1550 may transmit or receive a signal via the baseband processor 1520 and the RF processor 1510, or via the backhaul communication unit 1530. In addition, the controller 1550 may record data in the storage 1540 and read the data therefrom. To this end, the controller 1550 may include at least one processor. The controller 1550 may control the operation of a base station according to various embodiments of the disclosure.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a user equipment (UE) in a wireless communication system, the method comprising:
   transmitting master cell group (MCG) failure information to a base station of a secondary cell group (SCG);
   receiving a radio resource control (RRC) reconfiguration message from the base station; and
   in case that the RRC reconfiguration message is received via a signaling radio bearer (SRB) 3 of the SCG:
      in case that the RRC reconfiguration message is included in a downlink information transfer message, transmitting an RRC reconfiguration complete message via an SRB1 configured based on the RRC reconfiguration message, and
      in case that the RRC reconfiguration message is not included in the downlink information transfer message, transmitting the RRC reconfiguration complete message via the SRB3.

2. The method of claim 1, wherein the downlink information transfer message corresponds to downlink (DL) information transfer multi radio (MR) dual connectivity (DC) message.

3. The method of claim 1, further comprising:
   in case that the RRC reconfiguration message is received via a split SRB1, transmitting the RRC reconfiguration complete message via the SRB1 configured based on the RRC reconfiguration message.

4. The method of claim 1, wherein the RRC reconfiguration message includes handover information, and the SRB1 is an SRB1 of a target cell that is configured based on the handover information.

5. The method of claim 1,
wherein, in case that a split SRB1 is configured, the MCG failure information is transmitted to the base station via the split SRB1, and
wherein, in case that the SRB3 is configured, the MCG failure information is included in an uplink information transfer message and is transmitted via the SRB3.

6. The method of claim 1,
wherein information indicating whether MCG failure recovery is supported is reported via UE capability information, and
wherein the MCG failure information includes a type of failure, MCG measurement information, and SCG measurement information.

7. A user equipment (UE) in a wireless communication system, the UE comprising:
a transceiver; and
a controller configured to:
transmit master cell group (MCG) failure information to a base station of a secondary cell group (SCG),
receive a radio resource control (RRC) reconfiguration message from the base station, and
in case that the RRC reconfiguration message is received via a signaling radio bearer (SRB) 3 of the SCG:
in case that the RRC reconfiguration message is included in a downlink information transfer message, transmit an RRC reconfiguration complete message via an SRB1 configured based on the RRC reconfiguration message, and
in case that the RRC reconfiguration message is not included in the downlink information transfer message, transmit the RRC reconfiguration complete message via the SRB3.

8. The UE of claim 7, wherein the downlink information transfer message corresponds to a downlink (DL) information transfer multi radio (MR) dual connectivity (DC) message.

9. The UE of claim 7, wherein, in case that the RRC reconfiguration message is received via a split SRB1, the controller is further configured to transmit the RRC reconfiguration complete message via the SRB1 configured based on the RRC reconfiguration message.

10. The UE of claim 7, wherein the RRC reconfiguration message includes handover information, and the SRB1 is an SRB1 of a target cell that is configured based on the handover information.

11. The UE of claim 7,
wherein, in case that a split SRB1 is configured, the MCG failure information is transmitted to the base station via the split SRB1, and
wherein, in case that the SRB3 is configured, the MCG failure information is included in an uplink information transfer message and is transmitted via the SRB3.

12. The UE of claim 7, wherein information indicating whether an MCG failure recovery is supported is reported via UE capability information.

13. A method performed by a base station of a secondary cell group (SCG) in a wireless communication system, the method comprising:
receiving, from a user equipment (UE), master cell group (MCG) failure information;
transmitting, to the UE, a radio resource control (RRC) reconfiguration message; and
in case that the RRC reconfiguration message is transmitted via a signaling radio bearer (SRB) 3 of the SCG and the RRC reconfiguration message is not included in a downlink information transfer message, receiving an RRC reconfiguration complete message via the SRB3,
wherein, in case that the RRC reconfiguration message is transmitted via the SRB3 and the RRC reconfiguration message is included in the downlink information transfer message, the RRC reconfiguration complete message is transmitted by the UE via an SRB1 configured based on the RRC reconfiguration message.

14. The method of claim 13,
wherein the downlink information transfer message corresponds to downlink (DL) information transfer multi radio (MR) dual connectivity (DC) message,
wherein information indicating whether MCG failure recovery is supported is reported via UE capability information, and
wherein the MCG failure information includes a type of failure, MCG measurement information, and SCG measurement information.

15. The method of claim 13, wherein, in case that the RRC reconfiguration message is transmitted via a split SRB1, the RRC reconfiguration complete message is transmitted by the UE via the SRB1 configured based on the RRC reconfiguration message.

16. The method of claim 13,
wherein the RRC reconfiguration message includes handover information, and the SRB1 is an SRB1 of a target cell that is configured based on the handover information,
wherein, in case that a split SRB1 is configured, the MCG failure information is transmitted to the base station via the split SRB1, and
wherein, in case that the SRB3 is configured, the MCG failure information is included in an uplink information transfer message and is transmitted via the SRB3.

17. A base station of a secondary cell group (SCG) in a wireless communication system, the base station comprising:
a transceiver; and
a controller configured to:
receive, from a user equipment (UE), master cell group (MCG) failure information,
transmit, to the UE, a radio resource control (RRC) reconfiguration message, and
in case that the RRC reconfiguration message is transmitted via a signaling radio bearer (SRB) 3 of the SCG and the RRC reconfiguration message is not included in a downlink information transfer message, receive an RRC reconfiguration complete message via the SRB3,
wherein, in case that the RRC reconfiguration message is transmitted via the SRB3 and the RRC reconfiguration message is included in the downlink information transfer message, the RRC reconfiguration complete message is transmitted by the UE via an SRB1 configured based on the RRC reconfiguration message.

18. The base station of claim 17,
wherein the downlink information transfer message corresponds to downlink (DL) information transfer multi radio (MR) dual connectivity (DC) message,
wherein information indicating whether MCG failure recovery is supported is reported via UE capability information, and
wherein the MCG failure information includes a type of failure, MCG measurement information, and SCG measurement information.

19. The base station of claim 17, wherein, in case that the RRC reconfiguration message is transmitted via a split SRB1, the RRC reconfiguration complete message is transmitted by the UE via the SRB1 configured based on the RRC reconfiguration message.

20. The base station of claim 17,
   wherein the RRC reconfiguration message includes handover information, and the SRB1 is an SRB1 of a target cell that is configured based on the handover information,
   wherein, in case that a split SRB1 is configured, the MCG failure information is transmitted to the base station via the split SRB1, and
   wherein, in case that the SRB3 is configured, the MCG failure information is included in an uplink information transfer message and is transmitted via the SRB3.

* * * * *